(12) United States Patent
Iida

(10) Patent No.: US 11,570,017 B2
(45) Date of Patent: Jan. 31, 2023

(54) BATCH INFORMATION PROCESSING APPARATUS, BATCH INFORMATION PROCESSING METHOD, AND PROGRAM

(71) Applicant: SONY CORPORATION, Tokyo (JP)

(72) Inventor: Fumihiko Iida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/051,843

(22) PCT Filed: May 24, 2019

(86) PCT No.: PCT/JP2019/020705
§ 371 (c)(1),
(2) Date: Oct. 30, 2020

(87) PCT Pub. No.: WO2019/235263
PCT Pub. Date: Dec. 12, 2019

(65) Prior Publication Data
US 2021/0167982 A1 Jun. 3, 2021

(30) Foreign Application Priority Data
Jun. 6, 2018 (JP) .............................. JP2018-108860

(51) Int. Cl.
*H04L 12/28* (2006.01)
*G06F 3/01* (2006.01)

(52) U.S. Cl.
CPC ............ *H04L 12/282* (2013.01); *G06F 3/011* (2013.01); *G06F 3/017* (2013.01)

(58) Field of Classification Search
CPC .............. H04L 12/282; H04L 12/2816; H04L 12/2803; G06F 3/011; G06F 3/017;
(Continued)

(56) References Cited

U.S. PATENT DOCUMENTS 5,471,578 A * 11/1995 Moran ................ G06F 3/04845
715/764
7,978,178 B2 7/2011 Pehlivan et al.
(Continued)

FOREIGN PATENT DOCUMENTS

JP 10049700 A * 2/1998
JP H10-049700 A 2/1998
(Continued)

OTHER PUBLICATIONS

Dehmeshki et al., "ICE-Lasso: An Enhanced Form of Lasso Selection", 2009 IEEE TIC-STH, pp. 630-635, Sep. 1, 2009. (Year: 2009).*

*Primary Examiner* — Reza Nabi
*Assistant Examiner* — Hwei-Min Lu
(74) *Attorney, Agent, or Firm* — Paratus Law Group, PLLC

(57) ABSTRACT

An information processing apparatus includes a control unit (140) that executes a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

19 Claims, 25 Drawing Sheets

(58) Field of Classification Search
CPC ............... G06F 3/04815; G06F 3/0482; G06F 3/04842; G06F 3/0488; G06F 3/04883
USPC .......................................................... 715/863
See application file for complete search history.

(56) References Cited

U.S. PATENT DOCUMENTS

| | | | | |
|---|---|---|---|---|
| 2003/0007104 | A1* | 1/2003 | Hoshino | G08C 23/04 348/734 |
| 2003/0179235 | A1* | 9/2003 | Saund | G06F 3/0481 715/764 |
| 2010/0166313 | A1* | 7/2010 | Arai | G06V 30/1423 382/187 |
| 2010/0265196 | A1* | 10/2010 | Lee | G06F 3/04883 345/173 |
| 2012/0044179 | A1* | 2/2012 | Hudson | G06F 3/04883 345/173 |
| 2013/0141011 | A1* | 6/2013 | Fushimi | H05B 47/10 315/294 |
| 2013/0215022 | A1* | 8/2013 | Chihara | G06F 3/04842 345/157 |
| 2015/0248166 | A1* | 9/2015 | Mayanglambam | G06F 3/04883 345/173 |
| 2015/0293586 | A1* | 10/2015 | Kritt | G06F 3/013 345/158 |
| 2016/0162082 | A1* | 6/2016 | Schwesinger | G06F 3/04815 345/173 |
| 2018/0136721 | A1* | 5/2018 | Alleaume | G02B 27/017 |

FOREIGN PATENT DOCUMENTS

| | | |
|---|---|---|
| JP | 2003-018672 A | 1/2003 |
| JP | 2004-246856 A | 9/2004 |
| JP | 2007-259329 A | 10/2007 |
| JP | 2011-523800 A | 8/2011 |
| JP | 2011-254291 A | 12/2011 |
| JP | 2013-120623 A | 6/2013 |
| JP | 2015-232928 A | 12/2015 |
| WO | WO 2011/027397 A1 | 3/2011 |
| WO | WO 2018/008218 A1 | 1/2018 |

* cited by examiner

FIG. 3
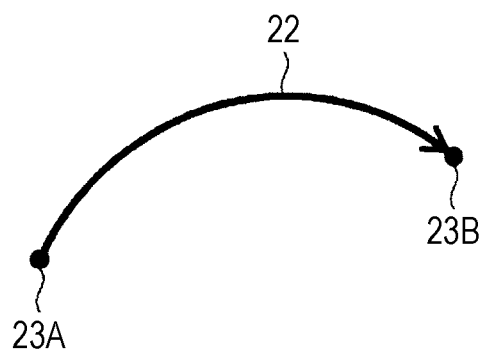 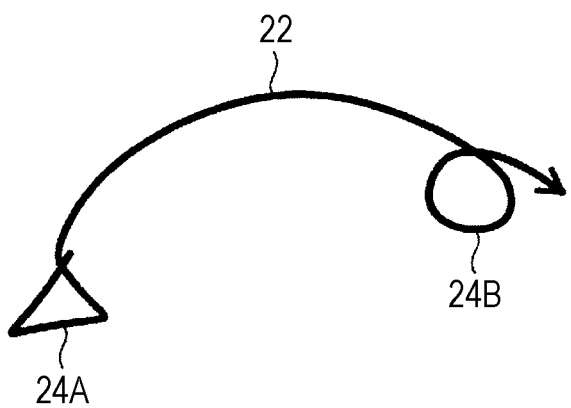
\<OPERATION EXAMPLE 1\>       \<OPERATION EXAMPLE 2\>
FIG. 4
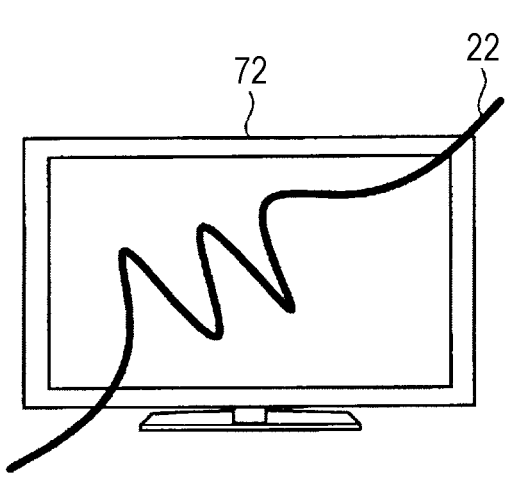 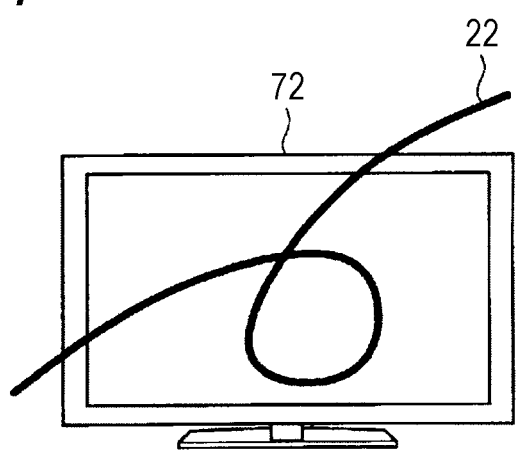
\<SELECTION EXAMPLE 1\>       \<SELECTION EXAMPLE 2\>

FIG. 8
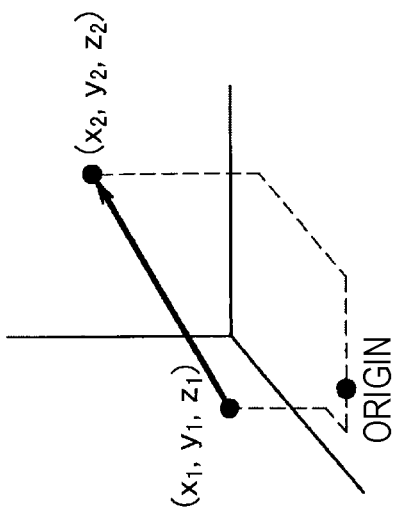
⟨DATA EXAMPLE 3⟩
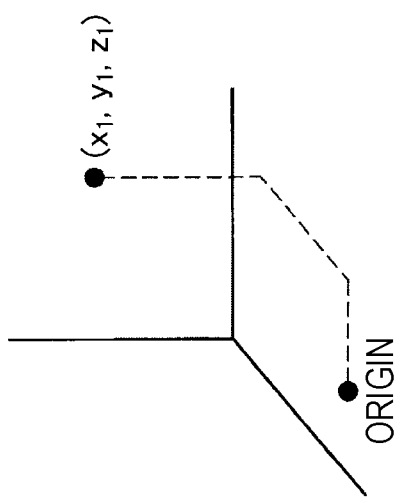
⟨DATA EXAMPLE 2⟩
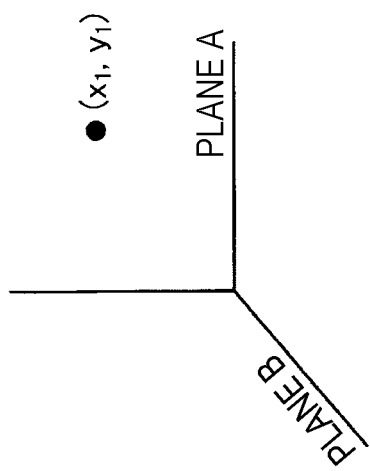
⟨DATA EXAMPLE 1⟩

FIG. 20
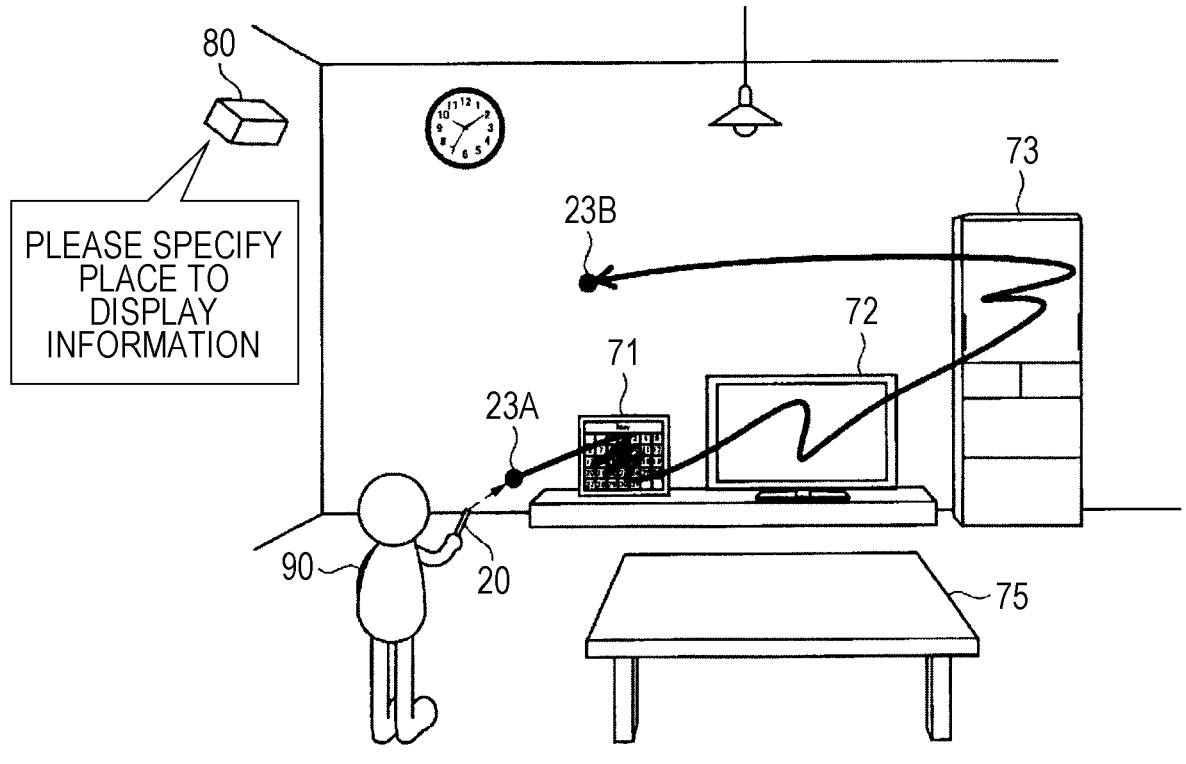
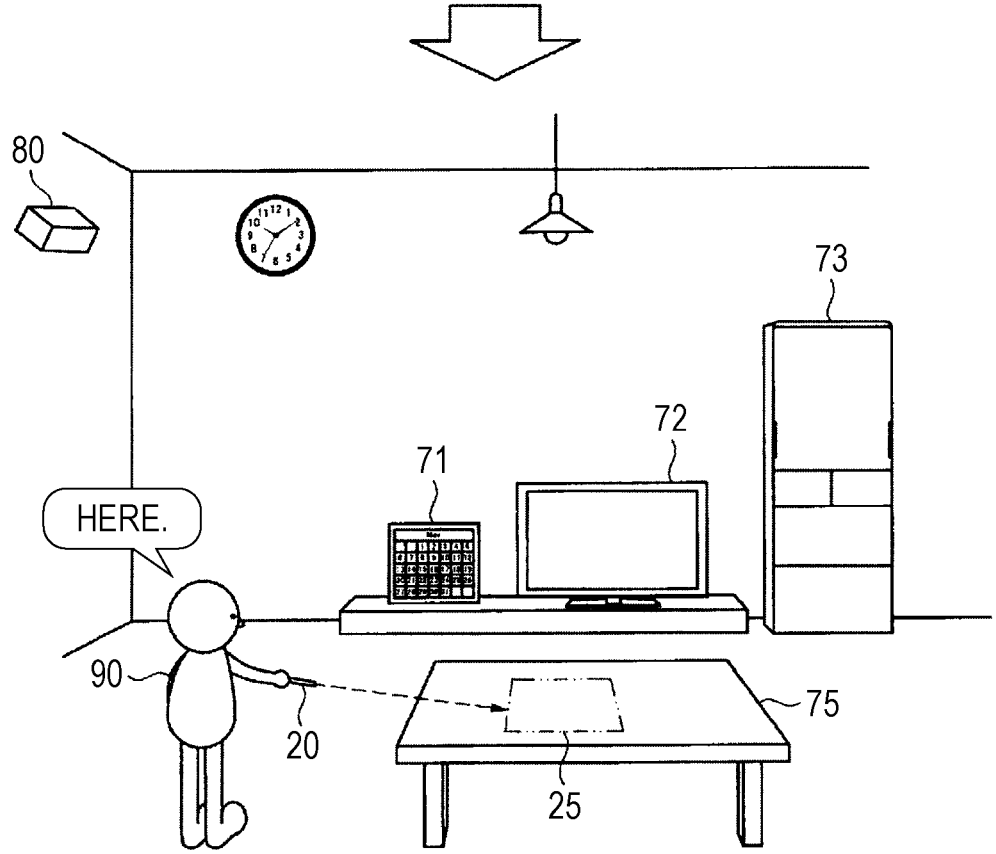

FIG. 21
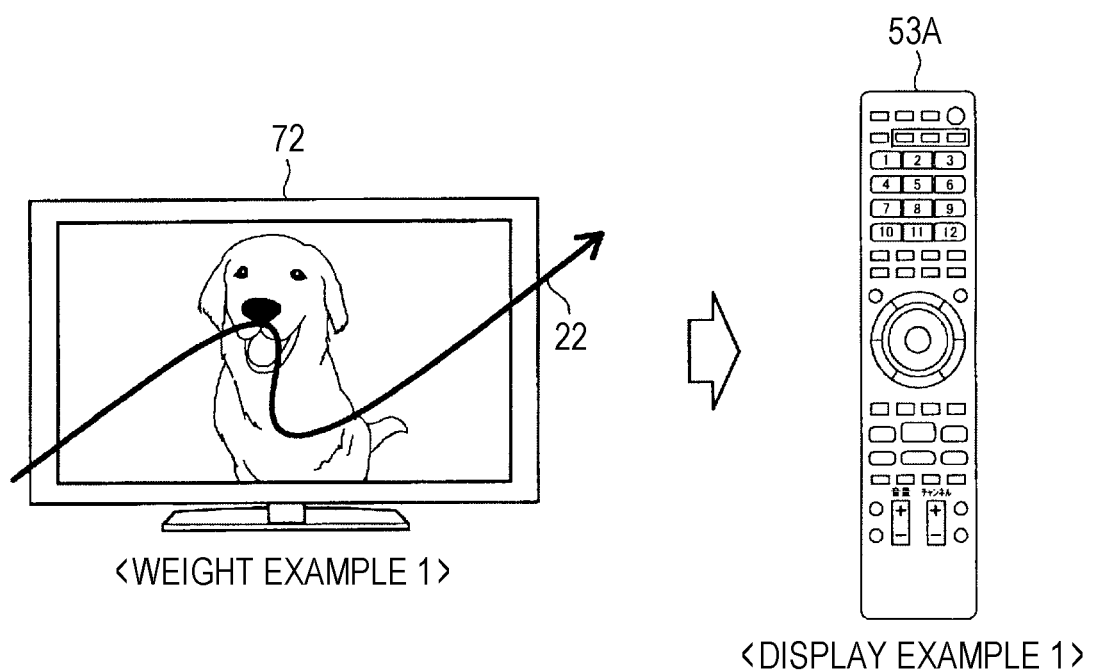
<WEIGHT EXAMPLE 1>
<DISPLAY EXAMPLE 1>
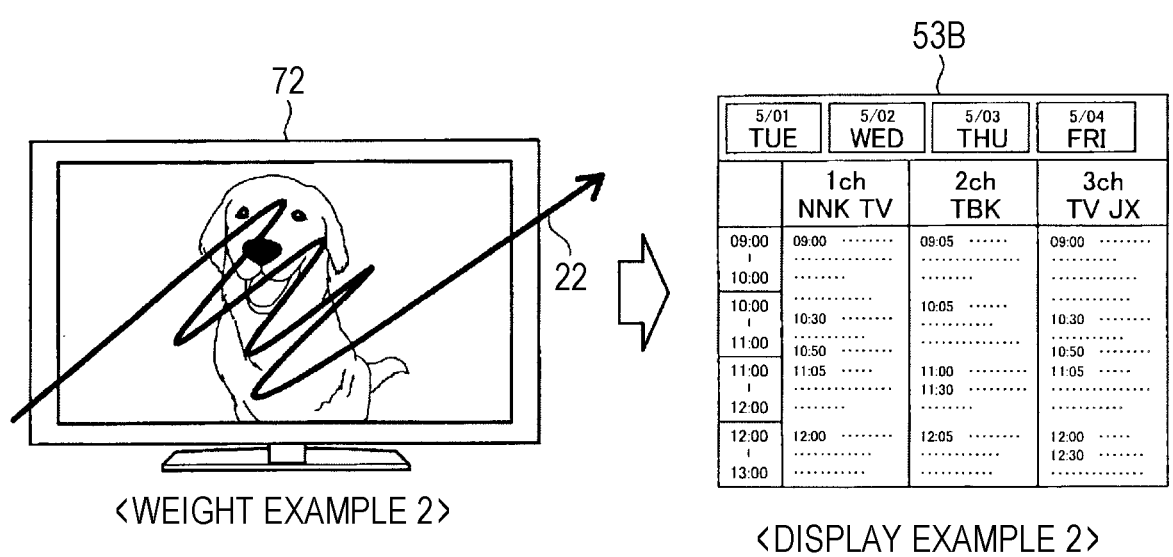
<WEIGHT EXAMPLE 2>
<DISPLAY EXAMPLE 2>

FIG. 22
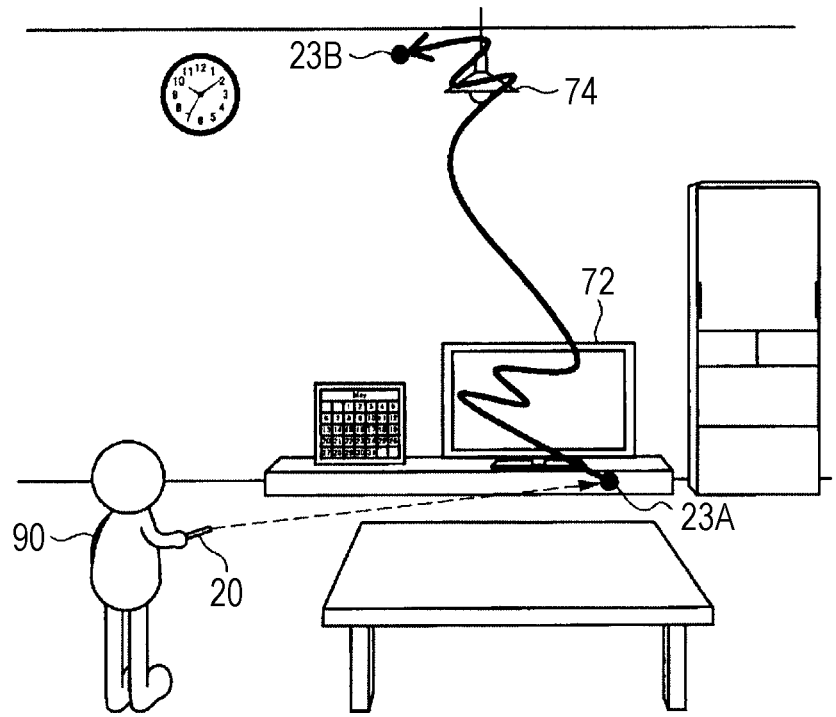
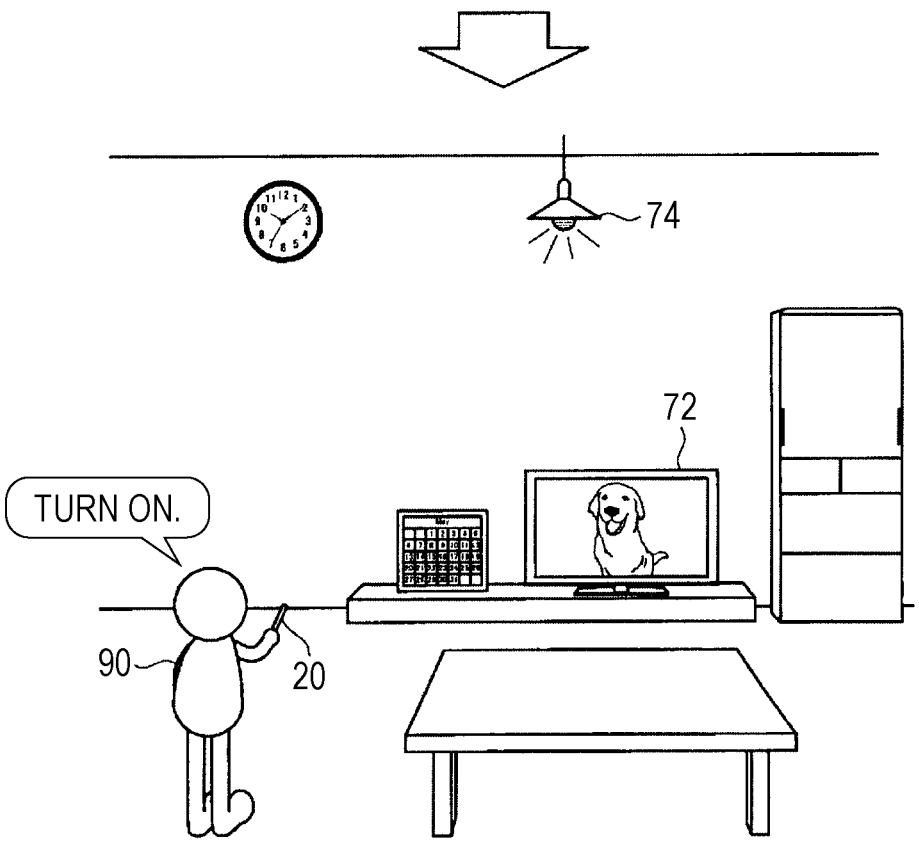

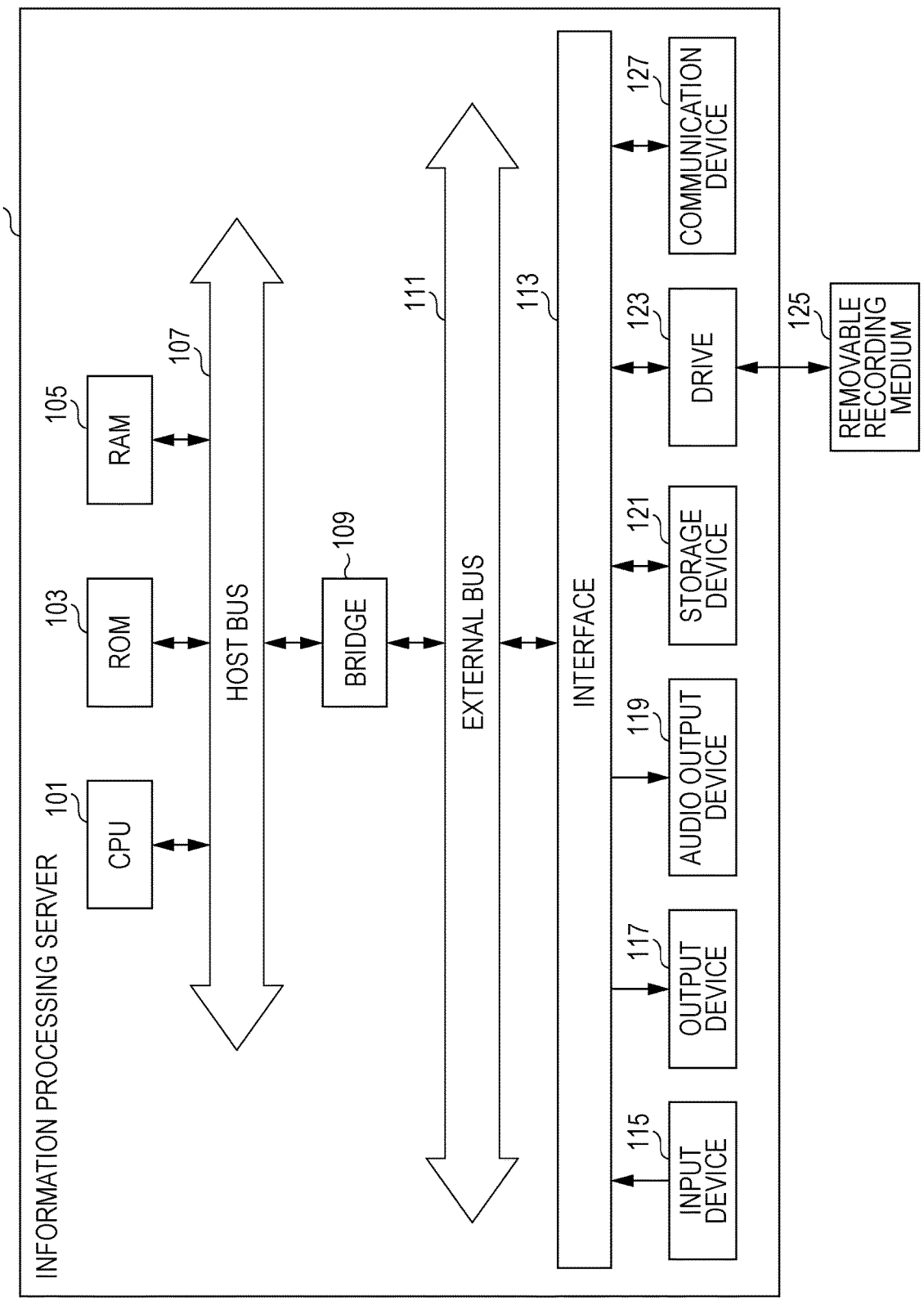

BATCH INFORMATION PROCESSING APPARATUS, BATCH INFORMATION PROCESSING METHOD, AND PROGRAM

CROSS REFERENCE TO PRIOR APPLICATION

This application is a National Stage Patent Application of PCT International Patent Application No. PCT/JP2019/020705 (filed on May 24, 2019) under 35 U.S.C. § 371, which claims priority to Japanese Patent Application No. 2018-108860 (filed on Jun. 6, 2018), which are all hereby incorporated by reference in their entirety.

TECHNICAL FIELD

The present disclosure relates to an information processing apparatus, an information processing method, and a program.

BACKGROUND ART

At present, technology related to smart homes has become widespread. This technology enables a user to, for example, select and operate a device existing in a living space by a gesture, a voice, or the like.

In association with the technology described above, for example, Patent Document 1 below discloses technology to detect a device to be operated on the basis of the line of sight of the user, and display an operating object for operating the device near the user, where the user uses the operating object to operate the device. In this technology, the user directs his or her line of sight to each of a plurality or devices to collectively select the plurality or devices, and an operating object for operating each of the selected devices is displayed near the user (for example, displayed at hand). Then, the user can operate the device at hand by selecting one device to be operated on the operating object and inputting an operation instruction for the selected device.

CITATION LIST

Patent Document

Patent Document 1: WO 2018/008218

SUMMARY OF THE INVENTION

Problems to be Solved by the Invention

However, the technology described above is on the assumption that the user selects one of the plurality of devices displayed on the operating object and sequentially executes a process of the selected device. Accordingly, the user cannot select a plurality of devices and cause respective processes of the devices to be executed at once, and it is necessary to repeat operations of selecting one device and inputting an operation instruction by the number of devices to be operated. Therefore, operability is not good when the user wants to execute processes of a plurality of devices at once.

Accordingly, the present disclosure proposes a new and improved information processing apparatus, information processing method, and program capable of improving operability when a user collectively selects a plurality of objects.

Solutions to Problems

According to the present disclosure, there is provided an information processing apparatus includes a control unit that executes a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

Further, according to the present disclosure, there is provided an information processing method executed by a processor including executing a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

Further, according to the present disclosure, there is provided a program causing a computer to function as a control unit that executes a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

Effects of the Invention

As described above, according to the present disclosure, it is possible to improve operability when a user collectively selects a plurality of objects.

Note that the above effect is not necessarily limited, and any of the effects illustrated in the present description or other effects that can be grasped from the present description may be exhibited together with or in place of the above effect.

BRIEF DESCRIPTION OF DRAWINGS

FIG. 3 is an explanatory diagram illustrating an operation example of the pointing device at a start or end of recording a track according to the same embodiment.

FIG. 4 is an explanatory diagram illustrating an example of a shape of the track when selecting a processing target according to the same embodiment.

FIG. 8 is an explanatory diagram illustrating an example of data stored in a storage unit according to the same embodiment.

FIG. 20 is an explanatory diagram illustrating a display example of information when there is no position specification according to the same embodiment and a display position cannot be estimated.

FIG. 21 is an explanatory diagram illustrating a presentation example of information based on weights according to the same embodiment.

FIG. 22 is an explanatory diagram illustrating an example of an operating process according to the same embodiment.

FIG. 26 is a block diagram illustrating a hardware configuration example of an information processing server according to the same embodiment.

MODE FOR CARRYING OUT THE INVENTION

Figure 1:
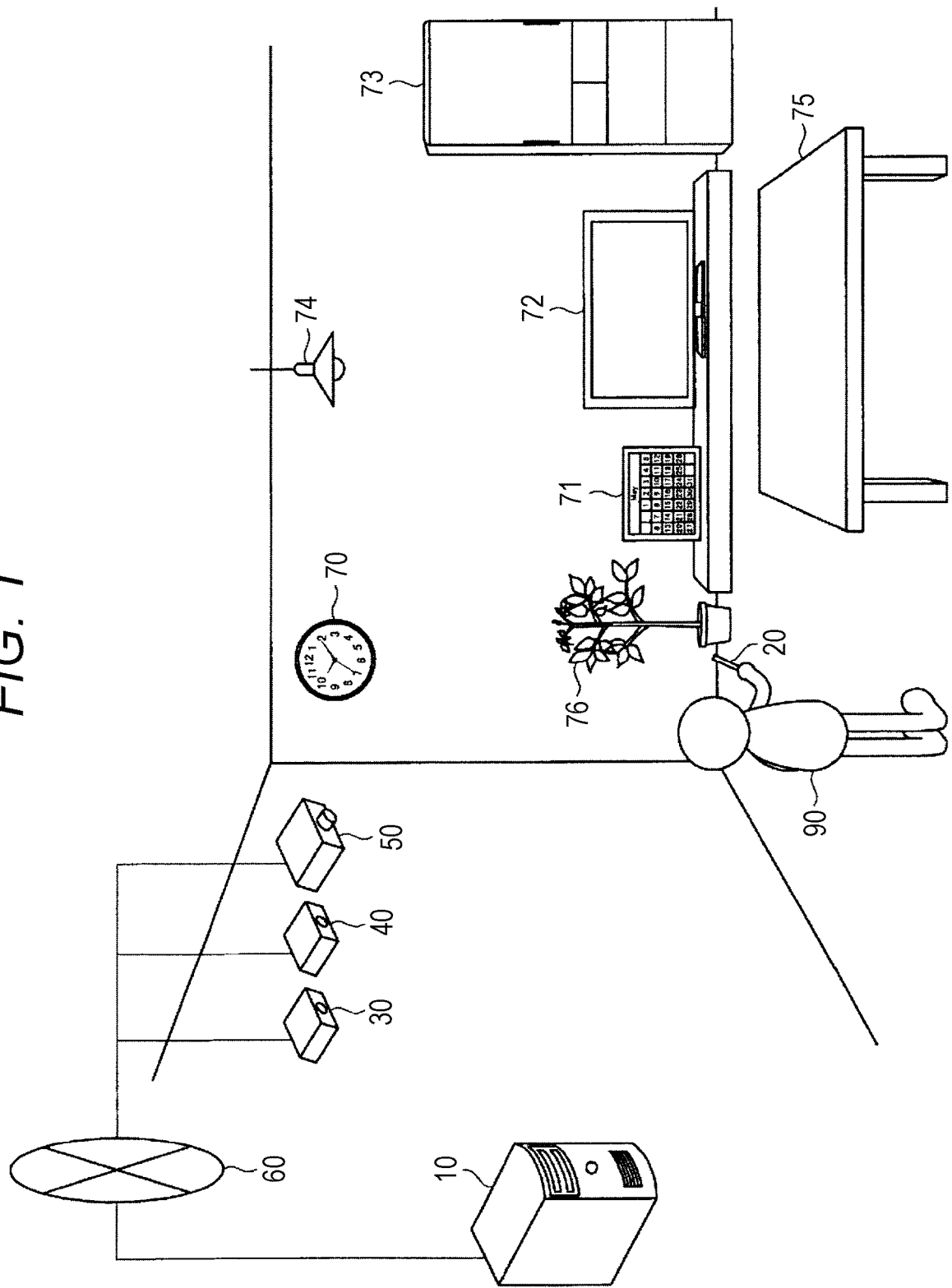
FIG. 1 is an explanatory diagram illustrating an overview of an information processing system according to an embodiment of the present disclosure.

Hereinafter, preferred embodiments of the present disclosure will be described in detail with reference to the accompanying drawings. Note that in the description and the drawings, components having substantially the same function and configuration are denoted by the same reference numerals, and redundant descriptions are omitted.

Note that the description will be made in the following order.

1. Embodiment of present disclosure
  1.1. System overview
  1.2. System configuration example
  1.3. Functional configuration example of information processing apparatus
  1.4. Operating example
2. Hardware configuration example
3. Summary 1. Embodiment of Present Disclosure In recent years, technology related to smart homes has become widespread. A smart home is, for example, a house in which devices such as home electric appliances existing in living spaces are connected to the Internet and operations of the home electric appliances are controlled, and thus more comfortable living can be achieved. Specifically, the user can select a device in a living space by voice and operate the selected device by voice. Since it may be difficult to operate the device with only the voice, there is also technology such that enables to select and operate the device by gesture.

However, the technology described above is on the assumption that the user selects one of the plurality of devices and sequentially executes a process of the selected device. Accordingly, the user cannot select a plurality of devices and cause respective processes of the devices to be executed at once, and it is necessary to repeat operations of selecting one device and inputting an operation instruction by the number of devices. Therefore, operability is not good when the user wants to execute processes of a plurality of devices at once.

The embodiment of the present disclosure is conceived in view of the points described above, and proposes technology capable of improving operability when the user collectively selects a plurality of objects. Note that in the following, operability when the user selects a plurality of objects such as home appliances installed in a living space will be described.

<1.1. System Overview>

An overview of an information processing system according to the embodiment of the present disclosure will be described below with reference to FIG. 1. FIG. 1 is an explanatory diagram illustrating the overview of the information processing system according to the embodiment of the present disclosure. Note that the information processing system according to the embodiment of the present disclosure includes an information processing server 10, a pointing device 20, an environment evaluation device 30, a sensor device 40, and a projection device 50 illustrated in FIG. 1. Further, respective components of the information system are connected to each other via a network 60.

The space illustrated in FIG. 1 is a living space, and a user 90 who holds the poi ting device 20 is present in the living space. The user 90 operates the pointing device 20 to select a device to be a target of an operation process (hereinafter also referred to as a processing target). Here, the operation process is a process related to a processing target executed by the information processing server 10. For example, in a case where there is information regarding a processing target (hereinafter, also referred to as processing target information), the information processing server 10 executes a process of causing a plurality of pieces of processing target information to be displayed by another device (for example, the projection device 50) (hereinafter, also referred to as a display process) as an operation process. Further, in a case where the plurality of processing targets is an information processing device such as a home electric appliance, the information processing server 10 executes a process of causing the plurality of processing targets to operate (hereinafter, also referred to as operating process) as an operation process.

Further, in the space illustrated in FIG. 1, there is a plurality of objects (hereinafter also referred to as selection targets) that the user can select as a processing target. The selection targets are classified into two types, real objects that actually exists in the space, and virtual objects projected by the projection device 50 in the space. The real objects are further classified into two types, objects that are information processing devices and objects other than information processing devices. The objects that are information processing devices in the present embodiment are, for example, a television 72, a refrigerator 73, and a light 74 illustrated in FIG. 1. Further, the objects that are not information processing devices in the present embodiment are, for example, an analog clock 70, a desk calendar 71, and a table 75 illustrated in FIG. 1. Further, an object that is not an information processing device and does not particularly have information to present to the user, such as a foliage plant 76, may be set to be excluded from the selection targets. Further, determination criteria for the object to be excluded from the selection targets may be, for example, that it is a consumable material such as food, or a moving body such as a person or an animal.

Further, a virtual object basically presents information regarding a real object and a virtual object. Furthermore, the virtual object may execute a function by being selected. The function is, for example, a function of an information processing device. Specifically, the virtual object may turn on the power of the television when selected by the user with the pointing device 20. In this manner, the virtual object may have a shortcut function that executes a function of the information processing device or the like by being selected.

Further, the virtual object may display information regarding another room or a remote place. For example, the virtual object displays information of an information processing device or the like placed in another room. For example, when the user selects a television in another room displayed in the virtual object with the pointing device 20, the virtual object may turn on the power of the television in the other room.

When selecting a processing target from the selection targets, the user 90 moves the position (user-specified position) of a pointer such as light output from the pointing device 20. The user 90 moves the position of the pointer and continuously touches a plurality of selection targets with the pointer (hereinafter, also referred to as one-stroke drawing) to thereby select the plurality of processing targets. The user 90 can collectively select a plurality of processing targets by performing the one-stroke drawing using the pointing device 20.

The information processing server 10 acquires position information of a selection target (hereinafter, also referred to as target position information) from the environment evaluation device 30. Further, the information processing server 10 acquires position information of the pointer (user-specified position information) by detecting the position of the pointer on the basis of sensing data acquired from the sensor device 40. The information processing server 10 can grasp a path along which the pointer has moved (hereinafter also referred to as a track) on the basis of the position information of the pointer. Then, the information processing server 10 performs a process of detecting a plurality of processing targets collectively selected by the user on the basis of the acquired target position information and the track (hereinafter, also referred to as a detection process).

When the user 90 collectively selects a plurality of processing targets, the information processing server 10 performs processing for executing respective operation processes for the devices at once (hereinafter, also referred to as a batch operation process). Note that the batch operation process may be executed on the basis of a specific operation by the user 90. The specific operation by the user 90 is, for example, an operation indicating to execute the batch operation process, and the user 90 uses the pointing device 20 to perform the specific operation.

In the batch operation process, for example, the same operation is performed on a plurality of devices. Specifically, an operation of turning on the power of a plurality of devices is collectively performed. Further, in the batch operation process, operations in the same category may be performed. Specifically, in a case where the category of operation is information display, each of the plurality of devices performs the same operation called information display, but the information to be displayed may be information according to each of the devices. Further, in the batch operation process, preset operations for every device may be simultaneously executed at once. Specifically, when the refrigerator 73 and the light 74 are collectively selected as processing targets, the information processing server 10 may execute a process of displaying the image of an inside for the refrigerator 73, and may execute a process of switching the power on and off by operating a toggle for the light 74. Note that in the following description, a batch operation process is performed as the operation process.

Further, the user 90 can present information indicating what batch operation process is to be executed by the information processing server 10 (hereinafter, also referred to as processing policy information) by a shape formed by moving the pointer (hereinafter, also referred to as the shape of the track). The information processing server 10 detects the processing policy information on the basis of the position information of the pointer measured by the sensor device 40, and executes the batch operation process on the basis of the detected processing policy information. Note that the shape of the track is a shape ween the track is viewed from the position of an operation object. Specifically, the shape of the track is a shape when the track is viewed from an output unit of the pointing device 20. That is, it is assumed that the shape of the track is detected while ignoring a difference in a depth direction when viewed from the output unit of the pointing device 20. For example, it is assumed that the shape of the track of the pointer that has moved in a circular shape in a manner of partly deviating from the television 72 to the wall beyond the television 72 is a circular shape. Note that the operation object is an object used by the user 90 for selecting a processing target, presenting the processing policy information, or the like, and may include the pointing device 20, a finger of the user 90, or the like. Further, the position of the operation object is, for example, the position of the output unit of the pointing device 20, the position of the tip of the finger of the user 90, or the like. Furthermore, the fact that the user 90 operates the pointing device 20 to present the processing policy information is an example of the specific operation by the user 90 described above.

As described above, the information processing server 10 executes the detection process and the batch operation process, thereby achieving improvement in operability when the user collectively selects a plurality of objects.

The overview of the information processing system according to the embodiment of the present disclosure has been described above with reference to FIG. 1. Next, a configuration example of the information processing system according to the embodiment of the present disclosure will be described.

<1.2. System Configuration Example>

Hereinafter, a configuration example of the information processing system according to the embodiment of the present disclosure will be described with reference to FIGS. 2 to 6.

(1) Information Processing Server 10

The information processing server 10 is an information processing apparatus having a function of executing a process based on information received from other components constituting the information processing system. For example, the information processing server 10 executes the detection process on the basis of information received from the environment evaluation device 30 and the sensor device 40. Further, the information processing server 10 also executes the batch operation process on the basis of the information received from the sensor device 40.

Further, the information processing server 10 is an information processing apparatus having a function of controlling processes of other components constituting the information processing system. For example, when the batch operation process is the display process, the information processing server 10 controls a projection process for the projection device 50 to present the processing target information. Note that the information processing server 10 may control an environment evaluation process by the environment evaluation device 30 and a sensing data acquisition process by the sensor device 40.

(2) Pointing Device 20

The pointing device 20 is a device used by the user 90 to select an object in a space. When operating the pointing device 20, the user 90 grips and operates the pointing device 20, for example. Further, the user 90 causes the pointing device 20 to start projection of the pointer by pressing a switch included in the pointing device 20. Furthermore, the user 90 causes the pointing device 20 to end the projection of the pointer by pressing the switch again while the pointing device 20 is projecting the pointer.

The pointing device 20 has a function of indicating a pointing position. For example, the pointing device 20 projects light from an infrared light emitting diode (IR LED) or the like, so as to indicate a position where the light is projected as a pointed position.

Further, the pointing device 20 has a communication function. With the communication function, the pointing device 20 transmits to the information processing server 10 information indicating whether or not it is in an activated state. For example, when the switch is pressed by the user and projection of the pointer is started, the pointing device 20 transmits information indicating that it is in the activated state to the information processing server 10. Further, the pointing device 20 may transmit information indicating that it is in a non-activated state to the information processing server 10 when the user presses the switch again while it is in the activated state and the projection of the pointer is ended.

Further, the pointing device 20 may include a sensor group such as an acceleration sensor. The pointing device 20 uses the sensor group to sense data regarding an attitude of the pointing device 20. Then, the pointing device 20 transmits the data to the information processing server 10 as data for the information processing server 10 to identify the position of the pointer.

Figure 2:
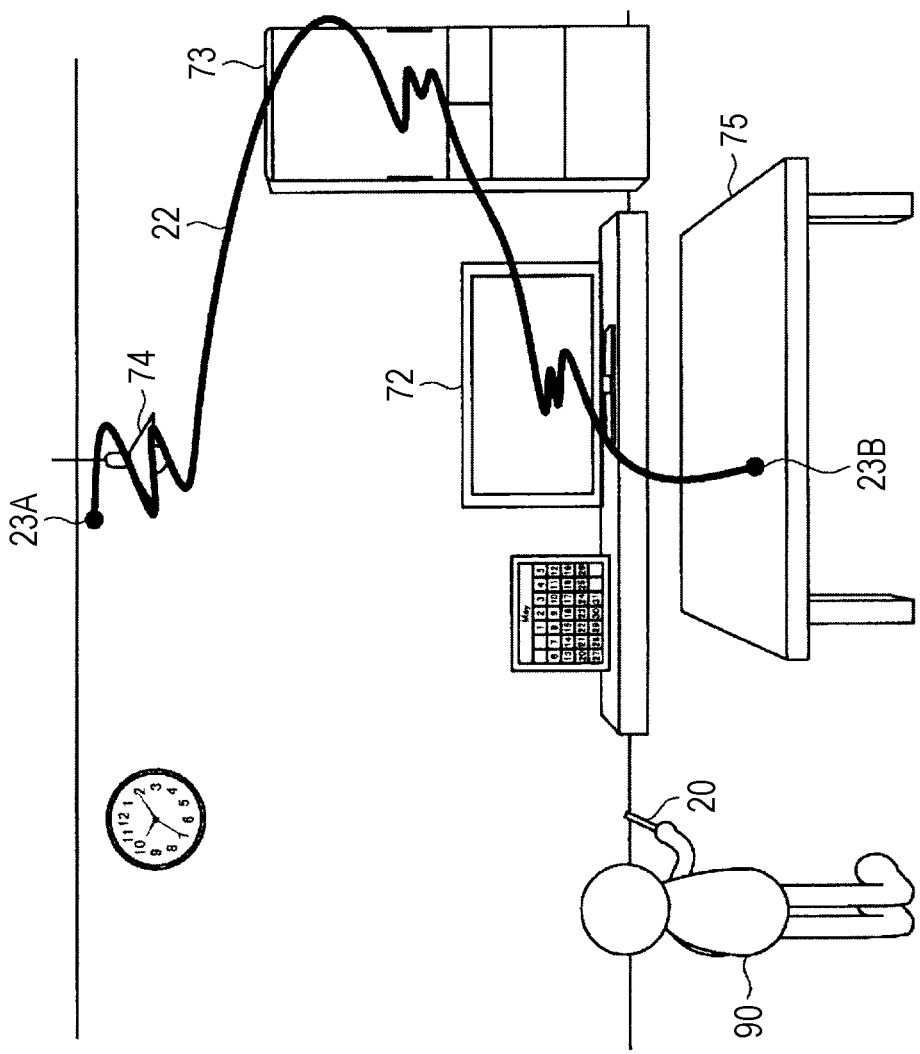
FIG. 2 is an explanatory diagram illustrating an operation example of a pointing device when selecting plurality of processing targets according to the same embodiment.

Here, an operation example of the pointing device 20 according to the embodiment of the present disclosure will be described with reference to FIGS. 2 to 4. FIG. 2 is an explanatory diagram illustrating an operation example of the pointing device 20 when selecting a plurality of processing targets according to the embodiment of the present disclosure. FIG. 3 is an explanatory diagram illustrating an operation example of the pointing device 20 at a start or end of recording a track according to the embodiment of the present disclosure. FIG. 4 is an explanatory diagram illustrating an example of a shape of the track when selecting a processing target according to the embodiment of the present disclosure.

FIG. 2 illustrates an example in which the user 90 uses the pointing device 20 to select the light 74, the refrigerator 73, and the television 72. First, the user 90 presses the switch of the pointing device 20 to cause the pointing device 20 to project the pointer at an arbitrary position (for example, a start position 23A).

After projecting the pointer at the start position 23A, the user 90 moves the pointer to select processing targets. At this time, the user 90 operates the pointing device 20 and moves the pointer so that the pointer is projected on the light 74, the refrigerator 73, and the television 72 as processing targets like a track 22. After selecting the processing targets, the user 90 presses the switch of the pointing device 20 again, and ends the projection of the pointer.

Note that in the embodiment of the present disclosure, recording of the track is started or ended by using an operation of the switch of the pointing device 20 by the user 90 as a trigger. For example, as illustrated in operation example 1 of FIG. 3, recording of the track is started from the start position 23A where the switch of the pointing device 20 is pressed to start projection of the pointer. Then, the track 22 is recorded when the user 90 moves the pointer to an end position 23B where the switch of the pointing device 20 is pressed again to end the projection of the pointer.

Further, in the embodiment of the present disclosure, the recording of the track may be started by using detection of a specific track as a trigger. For example, as illustrated in operation example 2 of FIG. 3, a position where a triangular track is detected may be a start position 24A, and a position where a circular track is detected may be an end position 24B.

Further, in the embodiment of the present disclosure, the user may move the pointer on a selection target to form a track having a specific shape on the selection target, thereby indicating that the selection target is selected as a processing target. For example, when the user wants to select the television 72 as a processing target, as illustrated in selection example 1 of FIG. 4, the user moves the pointer so that the track depicts a shape in which the track bends multiple times, thereby indicating that the television 72 is selected as a processing target. Further, as illustrated in selection example 2 of FIG. 4, the user may move the pointer so that the track indicates a circular shape, thereby indicating that the television 72 is selected as a processing target.

Note that the user 90 may point at a selection target with his or her finger instead of the pointing device 20 or point the finger to the selection target and draw the above-described specific shape in the air, thereby indicating that the selection target is selected.

(3) Environment Evaluation Device 30

The environment evaluation device 30 has a function of evaluating sensing data obtained by sensing a space and performing what is called space recognition such as recognizing a selection target in the space. For example, the environment evaluation device 30 acquires the distance to a wall surface in the space, the distance to the selection target in the space, and the like as the sensing data. The environment evaluation device 30 evaluates the acquired sensing data and acquires position information of the selection target in the space. Then, the environment evaluation device 30 transmits the acquired position information of the selection target to the information processing server 10.

The environment evaluation device 30 performs sensing of a space using, for example, a distance measuring device such as a depth sensor, a camera, or a Laser Imaging Detection and Ranging (LIDAR). Note that the device provided for the environment evaluation device 30 to perform sensing is not limited to the above-mentioned device, and may include any device. Further, the installation locations of the environment evaluation devices 30 and the number thereof to be installed in the space are not particularly limited, and any number of environment evaluation devices 30 may be installed at any location.

Further, in a case where the selection target has a function capable of specifying position information such as a near field communication (NFC) function, the environment evaluation device 30 may acquire position information based on the function.

Further, in a case where the selection target is an intangible virtual object, the environment evaluation device 30 may acquire position information of the virtual object from the projection device 50 that projects the virtual object. Further, the environment evaluation device 30 may acquire information regarding the state of the projection device 50 that is projecting the virtual object as sensing data, estimate the position, attitude, and projection direction of the projection device 50 and the like on the basis of the sensing data, and estimate the position or the virtual object on the basis of the estimation result. Furthermore, when the virtual object is displayed on the information processing device whose position is fixed, such as the television 72, the environment evaluation device 30 may acquire the position information of the virtual object on the basis of the position of the information processing device.

(4) Sensor Device 40

The sensor device 40 is a device having a function of acquiring sensing data. For example, the sensor device 40 acquires the state of the pointer as sensing data and transmits the sensing data to the information processing server 10. Specifically, the sensor device 40 captures an image of the state of the pointer with the camera, and transmits the captured image (still image or moving image) to the information processing server 10. Further, the sensor device 40 may measure acceleration data of the pointer with the acceleration sensor and transmit the acceleration data to the information processing server 10.

Further, the sensor device 40 acquires an action the user such as a user gesture as sensing data, and transmits the sensing data to the information processing server 10. Specifically, the sensor device 40 acquires attitude information indicating the attitude of the user using the depth sensor or the camera, and transmits the acquired attitude information to the information processing server 10.

Note that the device provided for the sensor device 40 to perform sensing is not limited to the above-mentioned device, and may include any device. Further, the installation locations of the sensor devices 40 and the number thereof to be installed in the space are not particularly limited, and any number of sensor devices 40 may be installed at any place.

(5) Projection Device 50

The projection device 50 is a device that projects content. For example, the projection device 50 may be a drive-type optical projection device. The projection device 50 is used to project information regarding a plurality of processing targets for presentation to the user.

Figure 5:
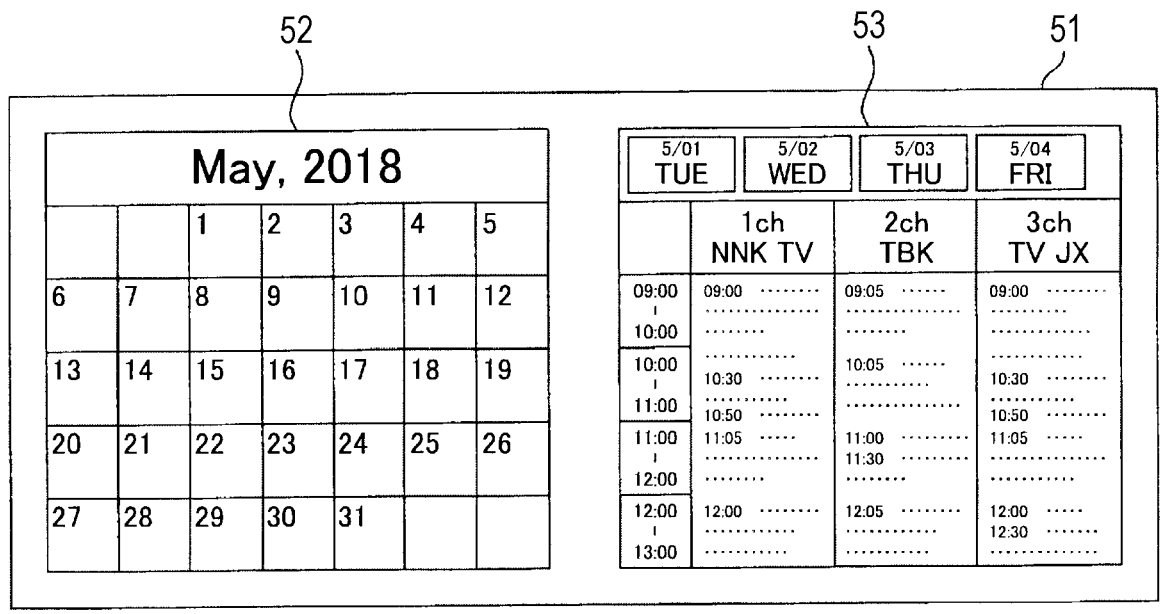
FIG. 5 is an explanatory diagram illustrating a presentation example of information regarding processing targets according to the same embodiment.

Here, a presentation example of information by the projection device 50 according to the embodiment of the present disclosure will be described with reference to FIGS. 5 and 6. FIG. 5 is an explanatory diagram illustrating a presentation example of information regarding processing targets according to the embodiment of the present disclosure. For example, it is assumed that the user 90 selects the desk calendar 71 and the television 72 as processing targets by the pointing device 20. In this case, the projection device 50 projects, as processing target information 51, calendar information 52 that is information regarding the desk calendar 71 and program information 53 that is information regarding the television 72, as illustrated in FIG. 5.

Figure 6:
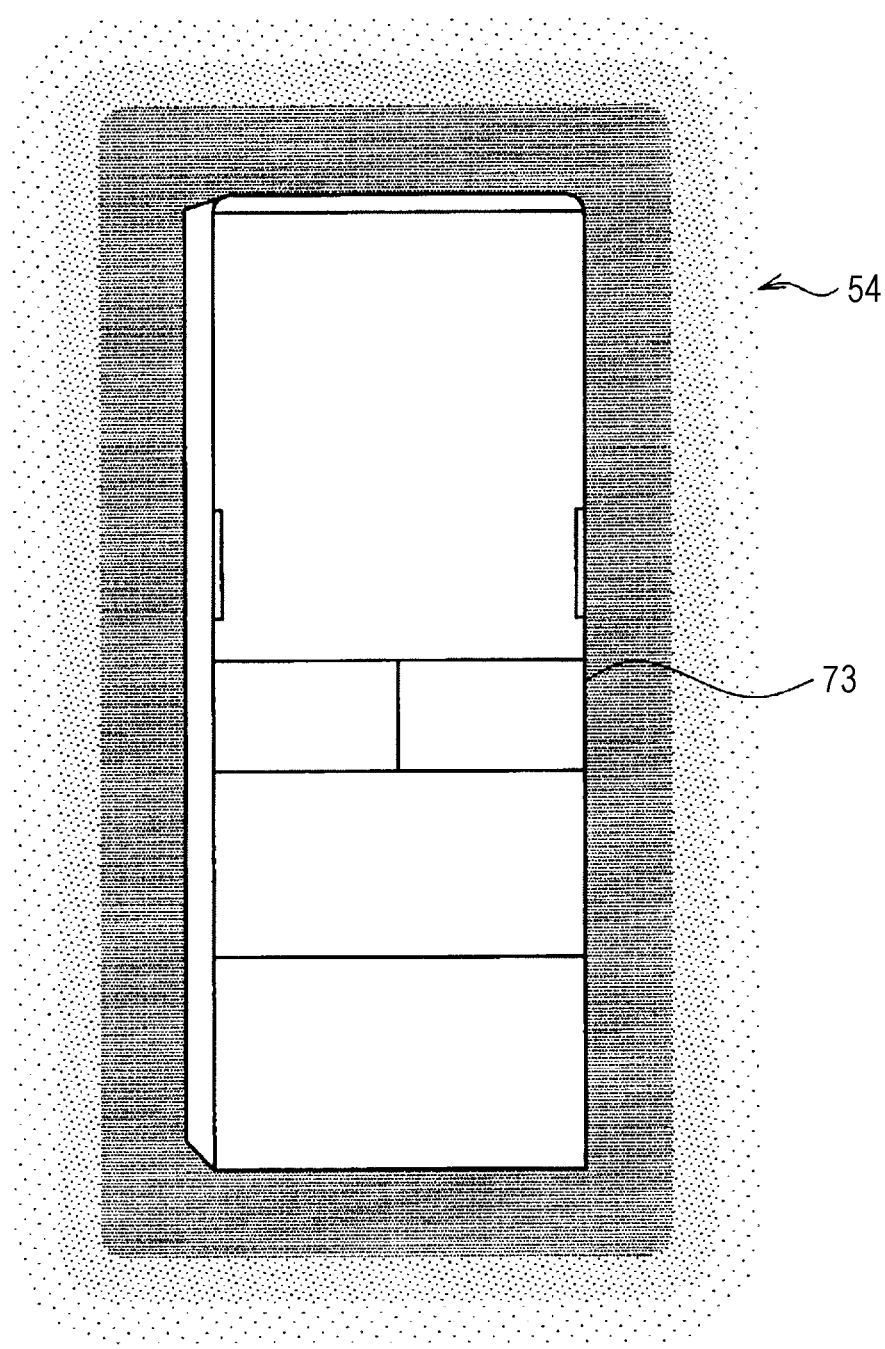
FIG. 6 is an explanatory diagram illustrating a presentation example of a selection state of a processing target according to the same embodiment.

FIG. 6 is an explanatory diagram illustrating a presentation example of a selection state of a processing target according to the embodiment of the present disclosure. For example, when the user 90 selects the refrigerator 73 as the processing target by the pointing device 20, the projection device 50 may perform visual feedback (VFB) for projecting a visual effect on the refrigerator 73. For example, the projection device 50 performs VFB that projects content 54 such that an outer peripheral portion of the refrigerator 73 appears to emit light as illustrated in FIG. 6. This allows the user to visually recognize a selected state of the processing target.

Note that the method of presenting the information regarding a processing target and the selection state of the processing target is not limited to the examples described above, and any method may be used. For example, the information regarding the processing target and the selection state of the processing target may be presented as audio by an audio output device instead of the projection device 50. Further, the information regarding the processing target and the selection state of the processing target may be presented as tactile sensations by a device capable of presenting tactile sensations.

Further, the device that presents the information regarding the processing target and the selection state of the processing target described above are not limited to an optical projection device such as the projection device 50 described above, and any device may be used. For example, a wearable device such as an eyewear may be used.

The example of the configuration of the information processing system according to the embodiment of the present disclosure has been described above with reference to FIGS. 2 to 6. Next, a functional configuration example of the information processing apparatus according to the embodiment of the present disclosure will be described.

<1.3. Functional Configuration Example of Information Processing Apparatus>

Figure 7:
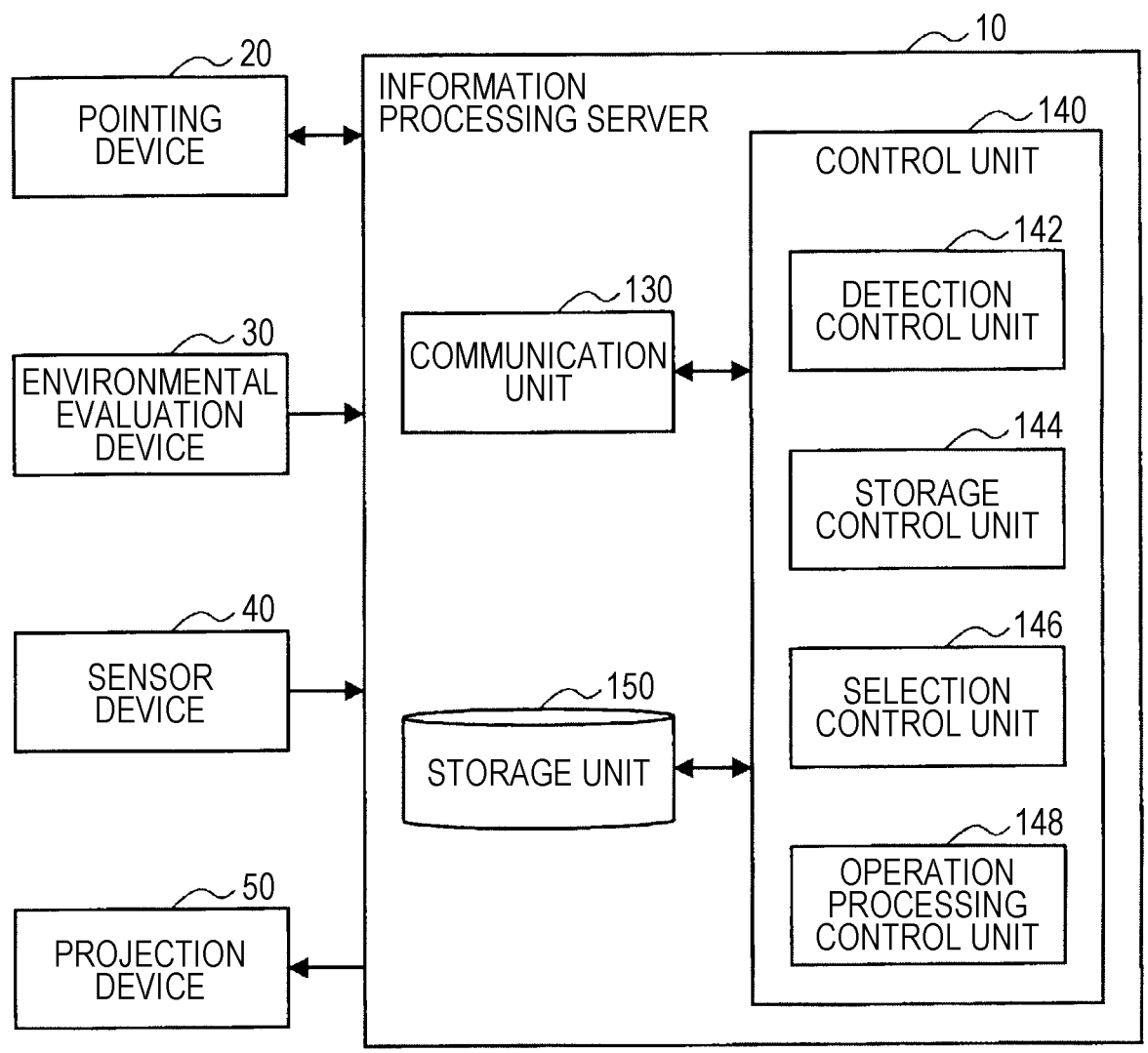
FIG. 7 is a block diagram illustrating a functional configuration example of an information processing apparatus according to the same embodiment.

Hereinafter, a functional configuration example of the information processing server 10 according to the embodiment of the present disclosure will be described with reference to FIGS. 7 to 22. FIG. 7 is a block diagram illustrating a functional configuration example of the information processing apparatus according to the embodiment of the present disclosure.

As illustrated in FIG. 7, the information processing server 10 according to the embodiment of the present disclosure includes a communication unit 130, a control unit 140, and a storage unit 150.

(1) Communication Unit 130

The communication unit 130 has a function of communicating with an external device. For example, the communication unit 130 outputs to the control unit 140 information received from the external device in communication with the external device. Specifically, the communication unit 130 outputs to the control unit 140 information received from the pointing device 20 and indicating whether or not it is in an activated state. Further, the communication unit 130 also outputs to the control unit 140 the position information of a selection target received from the environment evaluation device 30. Further, the communication unit 130 also outputs the sensing data received from the sensor device 40 to the control unit 140. Furthermore, the communication unit 130 also outputs processing target information received from a processing target to the control unit 140.

Further, the communication unit 130 transmits information input from the control unit 140 to the external device in communication with the external device. Specifically, the communication unit 130 transmits information regarding the display process input from the control unit 140 to the projection device 50. Furthermore, the communication unit 130 transmits, to the processing target, information regarding the batch operation process of the processing target input from the control unit 140.

(2) Control Unit 140

The control unit 140 has a function of controlling the entire information processing server 10. For example, the control unit 140 controls a communication process in the communication unit 130. Specifically, the control unit 140 outputs information output according to a process executed by the control unit 140 to the communication unit 130, and causes the communication unit 130 to transmit the information to an external device.

Further, the control unit 140 also controls a storage process in the storage unit 150. Specifically, the control unit 140 outputs information output according to the process executed by the control unit 140 to the storage unit 150 and causes the storage unit 150 to store the information.

Further, the control unit 140 also has a function of controlling the batch operation process. For example, the control unit 140 detects information necessary for controlling the batch operation process. Specifically, the control unit 140 detects the pointer on the basis of the sensing data input from the communication unit 130 and acquires the position information of the pointer. Further, the control unit 140 detects a track when the pointer moves on the basis of the acquired position information of the pointer. Further, the control unit 140 detects the processing target and the processing policy on the basis of the position information of the selection target input from the communication unit 130 and the detected track. Then, the control unit 140 determines and executes the batch operation process to be executed on the basis of the detected processing target and processing policy.

Note that the control unit 140 transmits a request regarding the batch operation process to each of the plurality of processing targets via the communication by the communication unit 130.

In order to achieve the above functions, the control unit 140 according to the embodiment of the present disclosure includes a detection control unit 142, a storage control unit 144, a selection control unit 146, and an operation processing control unit 148, as illustrated in FIG. 7.

(Detection Control Unit 142)

The detection control unit 142 has a function of detecting the position information of the pointer. For example, the detection control unit 142 detects the pointer on the basis of the sensing data sensed by the sensor device 40 and input from the communication unit 130. For example, when an image (still image or moving image) captured by the camera is the sensing data, the detection control unit 142 confirms whether or not the pointer is included in the image. When the pointer is included in the image, the detection control unit 142 acquires the position information in which the pointer is included in the image.

Further, when data related to the attitude of the pointing device 20 sensed by the sensor group, such as the acceleration sensor, included in the pointing device 20 is the sensing data, the detection control unit 142 estimates the attitude of the pointing device 20 on the basis of the sensor data. Then, the detection control unit 142 may estimate a pointing direction on the basis of the estimated attitude and identify the pointed position.

Further, the detection control unit 142 has a function of detecting a track based on the position information of the pointer that is continuously detected and detecting a processing policy input by the user on the basis of the shape indicated by the track. The detection control unit 142 compares a shape of a track registered in the storage unit 150 in advance with the shape indicated by the track detected on the basis of the position information of the pointer. When the shapes of both tracks match as a result of the comparison, the detection control unit 142 executes a process registered in association with the track shape registered in the storage unit 150 in advance.

Further, the detection control unit 142 sets a target range of the batch operation process on the basis of the shape indicated by the position information of the pointer that is continuously detected. For example, when a shape indicating to start detection of a track is detected, the detection control unit 142 sets the position of the position information of the pointer at that time as the start position of the target range of the batch operation process. Further, when a shape indicating to end the detection of the track is detected, the detection control unit 142 sets the position of the position information of the pointer at that time as the end position of the target range of the batch operation process.

Note that the detection control unit 142 may lose the position of the pointer while the user 90 is performing one-stroke drawing (that is, fail in detection of the position of the pointer). When the pointer is re-detected before a predetermined time passes after the position of the pointer is lost, the detection control unit 142 may determine that the one-stroke drawing corresponding to the re-detected pointer is the same as the one-stroke drawing before the loss. Further, when the track of the one-stroke drawing corresponding to the detected pointer regardless of the predetermined time is on an extension line of the track of the one-stroke drawing before the loss, the detection control unit 142 may determine that the one-stroke drawing corresponding to the re-detected pointer is the same as the one-stroke drawing before the loss.

Further, the detection control unit 142 may have a function of detecting the position pointed by the user 90 on the basis of an action of the user 90. For example, the detection control unit 142 recognizes a motion of a finger of the user 90 on the basis of information sensed by the camera, the depth sensor, or the like. Next, the detection control unit 142 detects the position and attitude or the like of the finger by analyzing the recognized motion of the finger of the user 90. Then, the detection control unit 142 detects, as a pointing position, a position pointed by the finger of the user 90 on the basis of the detected position and attitude or the like of the finger of the user 90.

(Storage Control Unit 144)

The storage control unit 144 has a function of controlling a process related to information stored in the storage unit 150. For example, the storage control unit 144 controls a track storage process of storing information regarding a track in the storage unit 150 and a spatial layout storage process of storing information regarding a spatial layout in the storage unit 150.

Control of Track Storage Process

The track storage process is a process in which the storage unit 150 stores the position information of the pointer detected by the detection control unit 142. The storage control unit 144 controls a timing at which the storage unit 150 starts storage of the position information of the pointer and a timing at which the storage unit 150 ends the storage.

For example, when it is detected that a shape indicated by the position information of the pointer that is continuously detected is a shape indicating to start detection of a track, the storage control unit 144 causes the storage unit 150 to start storage of the track at the position of the position information of the pointer at that time. Further, when it is detected that the shape indicated by the position information of the pointer that is continuously acquired is a shape indicating to end the detection of the track, the storage control unit 144 causes the storage unit 150 to end the storage of the track at the position of the position information of the pointer at that time.

Further, when it is detected that the shape indicated by the position information of the pointer that is continuously acquired is a shape indicating to detect a processing target, the storage control unit 144 causes the storage unit 150 to start storage of a track at the position of the position information of the pointer ate that time.

Here, an example of the position information of the pointer that the storage control unit 144 causes the storage unit 150 to store will be described with reference to FIG. 8. FIG. 8 is an explanatory diagram illustrating an example of data stored in the storage unit according to the embodiment of the present disclosure.

As illustrated in data example 1 of FIG. 8, in a case where the pointer is located at coordinates $(x_1, y_1)$ of a plane A, the storage control unit 144 causes the storage unit 150 to store the coordinates $(x_1, y_1)$. Further, as illustrated in data example 2, in a case where the pointer is located at coordinates $(x_1, y_1, z_1)$ with respect to the origin, the storage control unit 144 causes the storage unit 150 to store the coordinates $(x_1, y_1, z_1)$.

Further, as illustrated in data example 3, it is assumed that the pointing device 20 is located at coordinates $(x_1, y_1, z_1)$ and the pointer is located at coordinates $(x_2, y_2, z_2)$. In this case, the storage control unit 144 causes the storage unit 150 to store vector data connecting the coordinates $(x_1, y_1, z_1)$ and the coordinates $(x_2, y_2, z_2)$.

As described above, the position information of the pointer stored in the storage unit 150 by the storage control unit 144 may be any one of two-dimensional coordinates, three-dimensional coordinates, or vector data.

Further, the storage control unit 144 may cause the storage unit 150 to store a process corresponding to the shape of the track in advance as the track storage process. For example, the storage control unit 144 causes the storage unit 150 to store that the shape of the track indicating a circle is a shape indicating to select the processing target. Further, the storage unit 150 stores that the shape of the track indicating a triangle is a shape indicating to end recording of the track. Further, the storage unit 150 stores that the shape of the track indicating a quadrangle is a shape indicating a processing policy to display information of the processing target. Note that the combinations of the shape of the track and the corresponding process are not limited to the above example, and may be any combination. However, the storage control unit 144 controls the storage process of the storage unit 150 so that the shape of the track indicating that the user has selected the processing target and the shape of the track indicating the processing policy are different.

Control of Spatial Layout Storage Process

The spatial layout storage process is a process in which the storage unit 150 stores a name and position information of a selection target arranged in the space. The storage control unit 144 acquires the name and position information of the selection target arranged in the space on the basis of the position information of the selection target acquired by the environment evaluation device 30 and input from the communication unit 130. For example, in a case where position information of the refrigerator is acquired as the position information of the selection target, the storage control unit 144 causes the storage unit 150 to store "refrigerator" as the selection target name. Further, the storage control unit 144 causes the storage unit 150 to store the position information of the refrigerator in association with the selection target name "refrigerator".

In a case where the name and position information of the selection target are registered in the storage unit 150 by the user in advance, the storage control unit 144 does not need to acquire the name and position information of the selection target arranged in the space based on the position information of the selection target acquired by the environment evaluation device 30.

Further, in a case where the information of the selection target to be stored in the storage unit 150 includes information of an object or the like that the user cannot select, the storage control unit 144 may exclude the object or the like from the selection target.

(Selection Control Unit 146)

The selection control unit 146 has a function of detecting a processing target. For example, the selection control unit 146 detects a plurality of processing targets that is continuously selected on the basis of one continuous track of the position information of the pointer presented by the pointing device 20. Further, the selection control unit 146 may detect a plurality of processing targets that is continuously selected on the basis of one continuous track detected by finger-pointing by the user or movement of the line of sight of the user. Hereinafter, an example in which the selection control unit 146 selects a processing target from the selection targets on the basis of the track will be described with reference to FIGS. 9 to 16.

Selection Determination Based on Shape of Track

Figure 9:
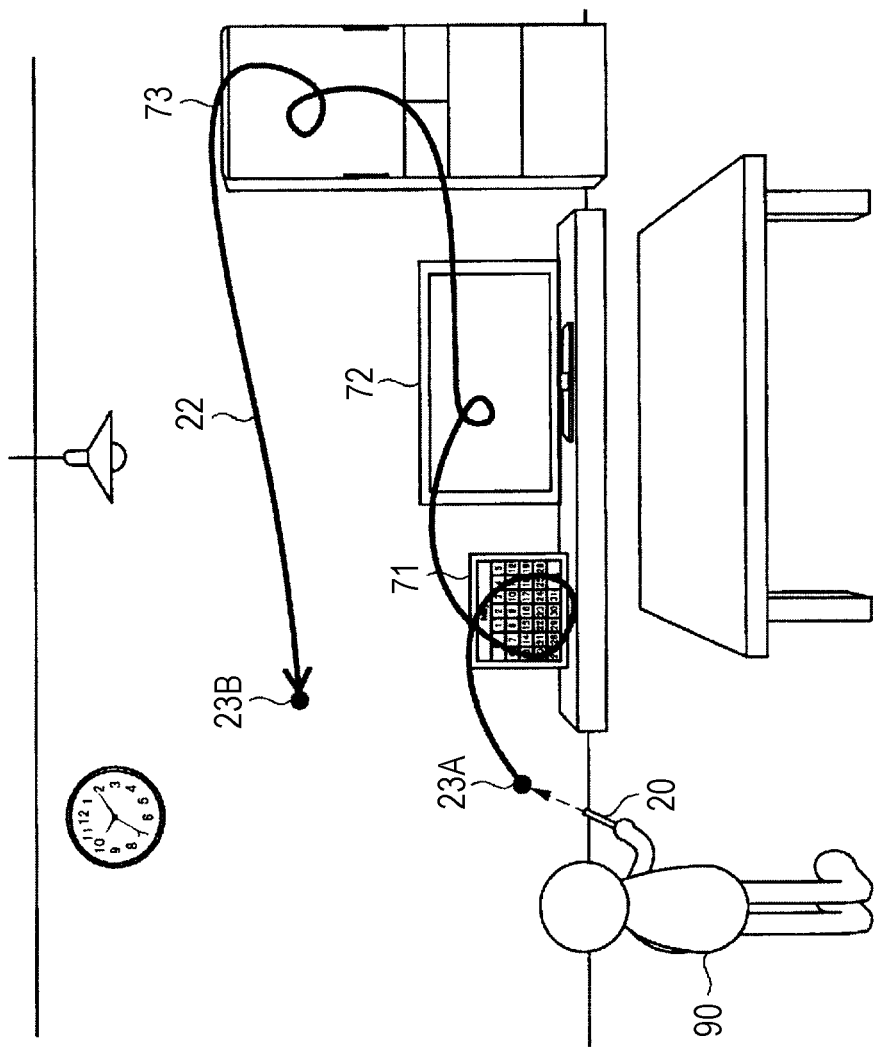
FIG. 9 is an explanatory diagram illustrating an example of selection determination based on the shape of the track on selection targets according to the same embodiment.

FIG. 9 is an explanatory diagram illustrating an example of selection determination based on the shape of the track on selection targets according to the embodiment of the present disclosure. In the example illustrated in FIG. 9, an example is illustrated in which the user 90 operates the pointing device 20 and moves the pointer from the start position 23A to the end position 23B as the track 22, so as to select the desk calendar 71, the television 72, and the refrigerator 73 as processing targets.

The selection control unit 146 determines whether or not a selection target is selected as a processing target on the basis of whether or not at least a part of the shape of the track indicating to detect a processing target is formed on the selection target. For example, it is assumed that the shape of the track indicating to detect the processing target is a circular shape. In the example illustrated in FIG. 9, when selecting the desk calendar 71, the television 72, and the refrigerator 73, the user 90 moves the pointer so that the shape of the track 22 becomes a circle, and at least a part of the shape of the track indicating to detect the processing target is formed on each selection target. Thus, the selection control unit 146 determines that the desk calendar 71, the television 72, and the refrigerator 73 are selected as processing targets.

Selection Determination Based on Staying Time of Pointer

Figure 10:
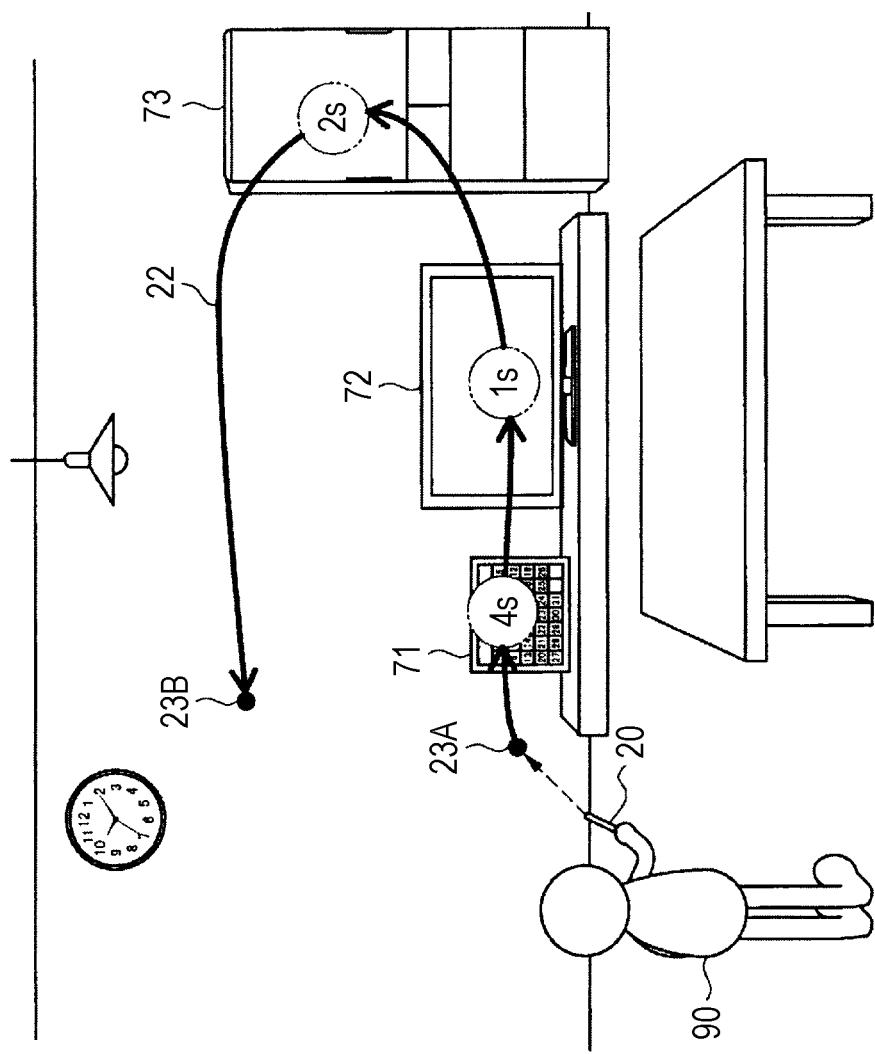
FIG. 10 is an explanatory diagram illustrating an example of selection determination based on staying times of a pointer on the selection targets according to the same embodiment.

As illustrated in FIG. 10, the selection control unit 146 may determine whether or not the selection target is selected as a processing target on the basis of a time for which the pointer stays on the selection target. FIG. 10 is an explanatory diagram illustrating an example of selection determination based on staying times of the pointer on selection targets according to the embodiment of the present disclosure. In the example illustrated in FIG. 10, an example is illustrated in which the user 90 operates the pointing device 20 and moves the pointer from the start position 23A to the end position 23B as the track 22, so as to select the desk calendar 71 and the refrigerator 73 as processing targets.

For example, when the pointer stays on a selection target for a predetermined time or more, the selection control unit 146 determines that the selection target is selected as a processing target. Specifically, it is assumed that the predetermined time is set to two seconds. In the example illustrated in FIG. 10, the pointer stays on the desk calendar 71 for four seconds, on the television 72 for one second, and on the refrigerator 73 for two seconds. Therefore, the selection control unit 146 determines that the desk calendar 71 and the refrigerator 73 are selected as processing targets.

Selection Determination Based on Bending of Track

Figure 11:
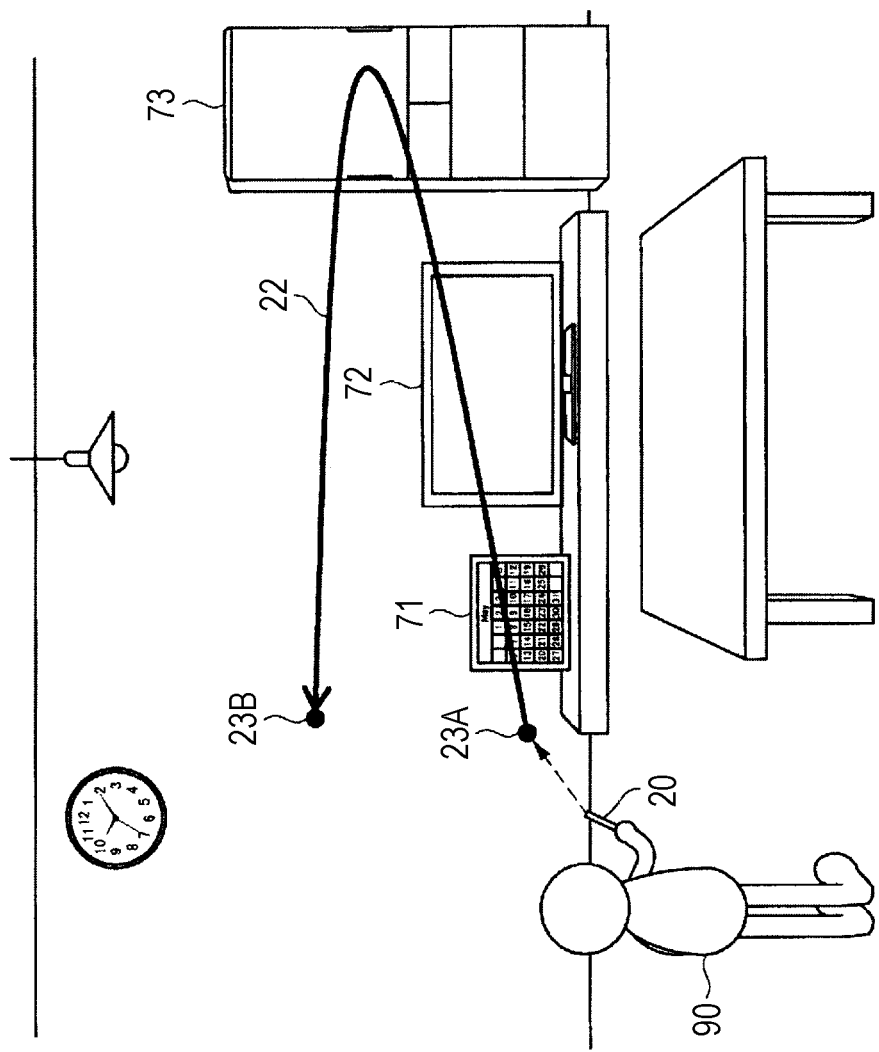
FIG. 11 is an explanatory diagram illustrating an example of selection determination based on bending of the track of the pointer on the selection targets according to the same embodiment.

As illustrated in FIG. 11, the selection control unit 146 may determine whether or not a selection target is selected as a processing target on the basis of whether or not the track of the pointer is bent on the selection target. FIG. 11 is an explanatory diagram illustrating an example of selection determination based on bending of the track of the pointer on the selection targets according to the embodiment of the present disclosure. In the example illustrated in FIG. 11, an example is illustrated in which the user 90 operates the pointing device 20 and moves the pointer from the start position 23A to the end position 23B like the track 22, so as to select the refrigerator 73 as a processing target.

For example, the selection control unit 146 determines that a selection target on which the track of the pointer on the selection target is bent within a predetermined angle is selected as a processing target. Specifically, it is assumed that the predetermined angle is set to 90 degrees. In the example illustrated in FIG. 11, an example is illustrated in which the track 22 of the pointer is almost a straight line on the desk calendar 71 and the television 72, but is bent at an angle within 90 degrees on the refrigerator 73. Therefore, the selection control unit 146 determines that the refrigerator 73 is selected as a processing target.

Selection Determination Based on Moving Speed of Pointer

Figure 12:
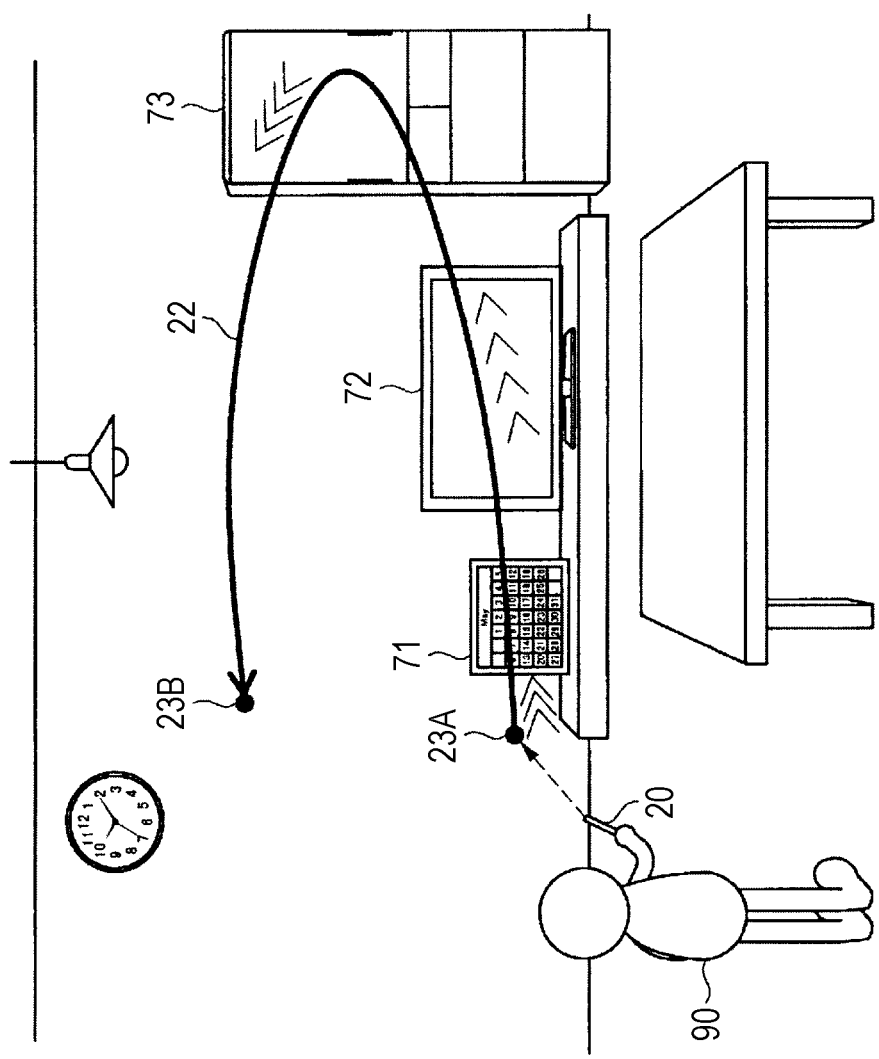
FIG. 12 is an explanatory diagram illustrating an example of selection determination based on acceleration or deceleration of moving speed of the pointer on the selection targets according to the same embodiment.

As illustrated in FIG. 12, the selection control unit 146 may determine whether or not a selection target is selected as a processing target on the basis of the acceleration or deceleration of moving speed of the pointer on the selection target. FIG. 12 is an explanatory diagram illustrating an example of selection determination based on acceleration or deceleration of moving speed of the pointer on the selection targets according to the embodiment of the present disclosure. In the example illustrated in FIG. 12, an example is illustrated in which the user 90 operates the pointing device 20 and moves the pointer like the track 22 from the start position 23A to the end position 23B, so as to select the desk calendar 71 and the refrigerator 73 as processing targets.

Note that symbols ">" depicted near the track 22 illustrated in FIG. 12 indicate acceleration or deceleration of the moving speed of the pointer. Four symbols ">" form a group, indicating that the moving speed of the pointer is accelerated when intervals between the four ">" decrease, and that the moving speed of the pointer is decelerated when the intervals between the four ">" increase.

For example, when the moving speed of the pointer on a selection target is accelerated, the selection control unit 146 determines that the selection target is selected as a processing target. In the example illustrated in FIG. 12, the moving speed of the pointer is accelerated on the desk calendar 71, decelerated on the television 72, and accelerated on the refrigerator 73. Therefore, the selection control unit 146 determines that the desk calendar 71 and the refrigerator 73 are selected as processing targets.

Selection Determination Based on Barycenter Position of Track Shape

Figure 13:
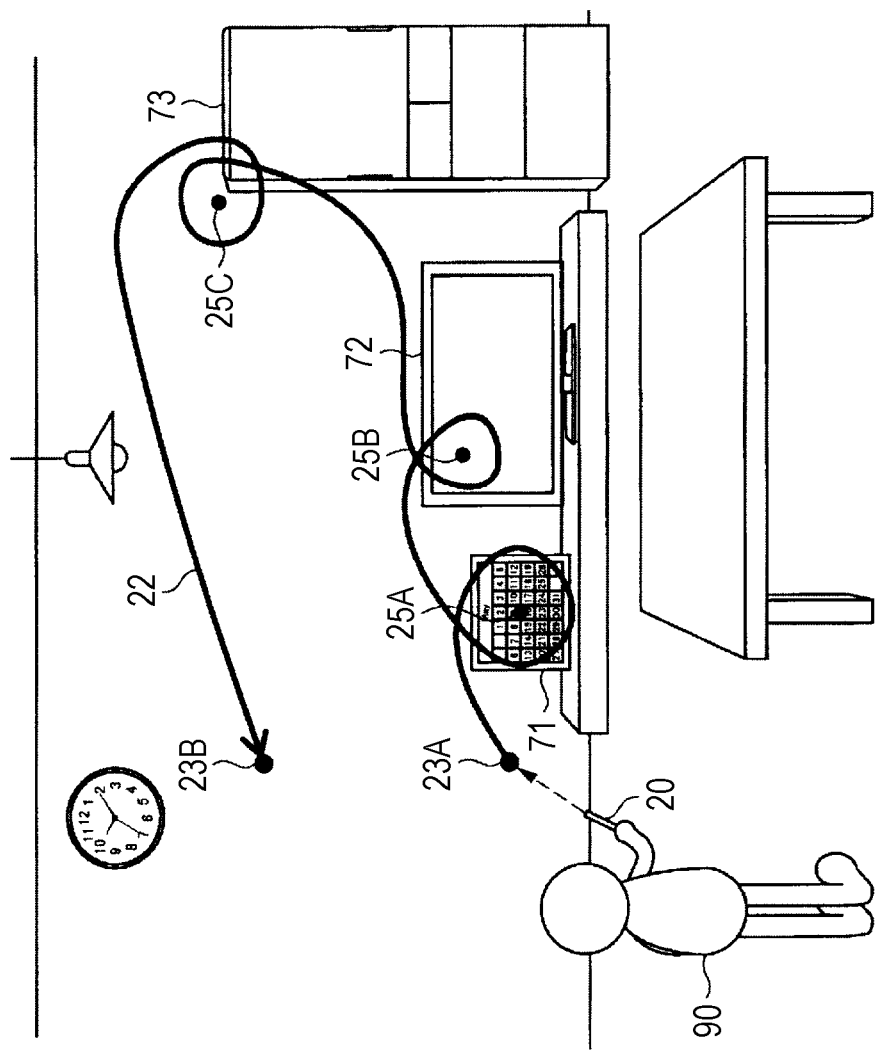
FIG. 13 is an explanatory diagram illustrating an example of selection determination based on a barycenter position of the shape of the track on the selection targets according to the same embodiment.

As illustrated in FIG. 13, when a shape of the track 22 and a selection target partially overlap with each other, the selection control unit 146 may determine whether or not the selection target is selected as a processing target on the basis of whether or not the barycenter of the shape of the track exists on the selection target. FIG. 13 is an explanatory diagram illustrating an example of selection determination based on a barycenter position of a shape of the track on the selection targets according to the embodiment of the present disclosure. In the example illustrated in FIG. 13, an example is illustrated in which the user 90 operates the pointing device 20 and moves the pointer from the start position 23A to the end position 23B like the track 22, so as to select the desk calendar 71 and the television 72 as processing targets.

For example, when the barycenter of a shape of the track indicating that a selection target has been selected as a processing target exists on the selection target, the selection control unit 146 determines that the selection target is selected as the processing target. In the example illustrated in FIG. 13, a barycenter 25A of a shape of the track indicating that a selection target has been selected as a processing target exists on the desk calendar 71, a barycenter 25B exists on the television 72, and a barycenter 25C does not exist on the refrigerator 73. Therefore, the selection control unit 146 determines that the desk calendar 71 and the refrigerator 73 are selected as processing targets.

As described above, by performing the selection determination based on the position of the barycenter of a shape of the track, the user 90 can easily select processing targets when a plurality of selection targets is close to each other.

Selection Determination Based on Area of Shape of Track

Figure 14:
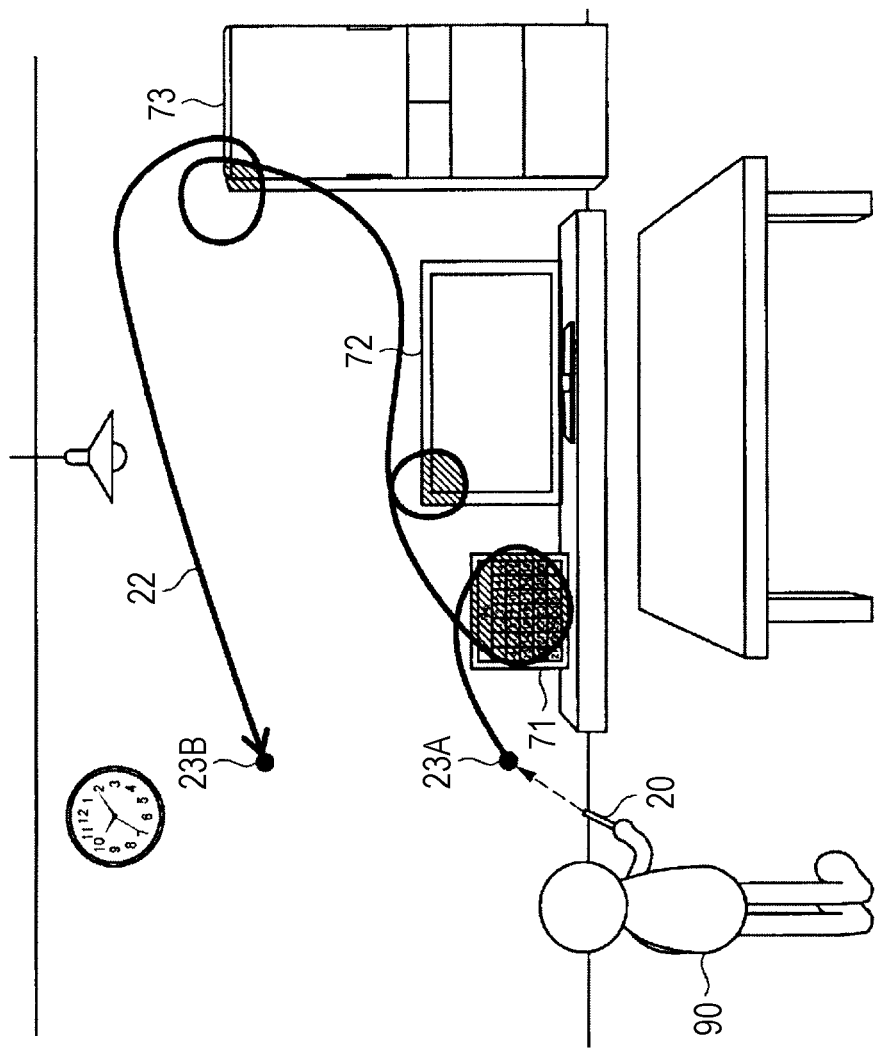
FIG. 14 is an explanatory diagram illustrating an example of selection determination based on the area of the shape of the track on the selection targets according to the same embodiment.

When a shape of the track and a selection target partially overlap as illustrated in FIG. 14, the selection control unit 146 may determine whether or not the selection target is selected as a processing target on the basis of the area of an overlapping portion. FIG. 14 is an explanatory diagram illustrating an example of selection determination based on the area of a shape of the track on the selection targets according to the embodiment of the present disclosure. In the example illustrated in FIG. 14, an example is illustrated in which the user 90 operates the pointing device 20 and moves the pointer like the track 22 from the start position 23A to the end position 23B, so as to select the desk calendar 71 and the television 72 as processing targets.

For example, when the area of a portion where a shape of the track indicating that a selection target has been selected as a processing target overlaps with the selection target is greater than or equal to a predetermined area, the selection control unit 146 determines that the selection target is selected as a processing target. Specifically, it is assumed that the predetermined area is set to be a quarter or more of the shape of the track. In the example illustrated in FIG. 14, the area of the portion where the shape of the track indicating that the selection target has been selected as the processing target overlaps with the selection target is equal to or greater than a quarter on the desk calendar 71, equal to or greater than a quarter on the television 72, and less than a quarter on the refrigerator 73. Therefore, the selection control unit 146 determines that the desk calendar 71 and the television 72 are selected as processing targets.

As described above, by performing the selection determination based on the area of the shape of the track, the user 90 can easily select processing targets when a plurality of selection targets is close to each other.

Selection Determination Based on Setting of Selection Target

Figure 15:
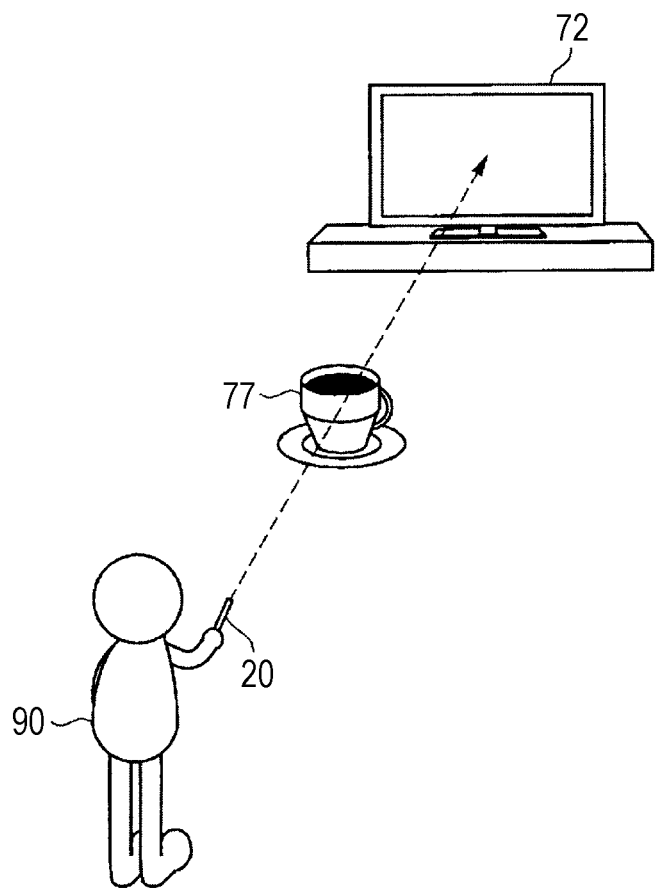
FIG. 15 is an explanatory diagram illustrating an example of a process when a non-selection target according to the same embodiment is selected.

As illustrated in FIG. 15, when a plurality of selection targets exists between the output unit of the pointing device 20 and the pointer, among the plurality of selection targets, the selection control unit 146 may exclude a selection target on which the process to be executed on the basis of the processing policy is not set, from the plurality of selection targets. FIG. 15 is an explanatory diagram illustrating an example of a process when a non-selection target according to the embodiment of the present disclosure is selected. In the example illustrated in FIG. 15, an example is illustrated in which when the user 90 operates the pointing device 20 and projects the pointer on the television 72, a mug 77, which is another selection target, exists between the output unit of the pointing device 20 and the television 72.

For example, the mug 77 has no particular information to present, and thus cannot present information on the basis of the processing policy. Further, since the mug 77 is not an information processing device, the mug 77 cannot operate on the basis of the processing policy. Accordingly, when registering the mug 77 as a selection target, the user 90 registers only the target name and does not register the process executed on the basis of the processing policy. Thus, when the mug 77, which is another selection target, exists between the output unit of the pointing device 20 and the television 72, the selection control unit 146 excludes the mug 77 from selection targets. Then, the selection control unit 146 can narrow down the television 72 as a selection target.

Selection Determination Based on Line of Sight of User

Figure 16:
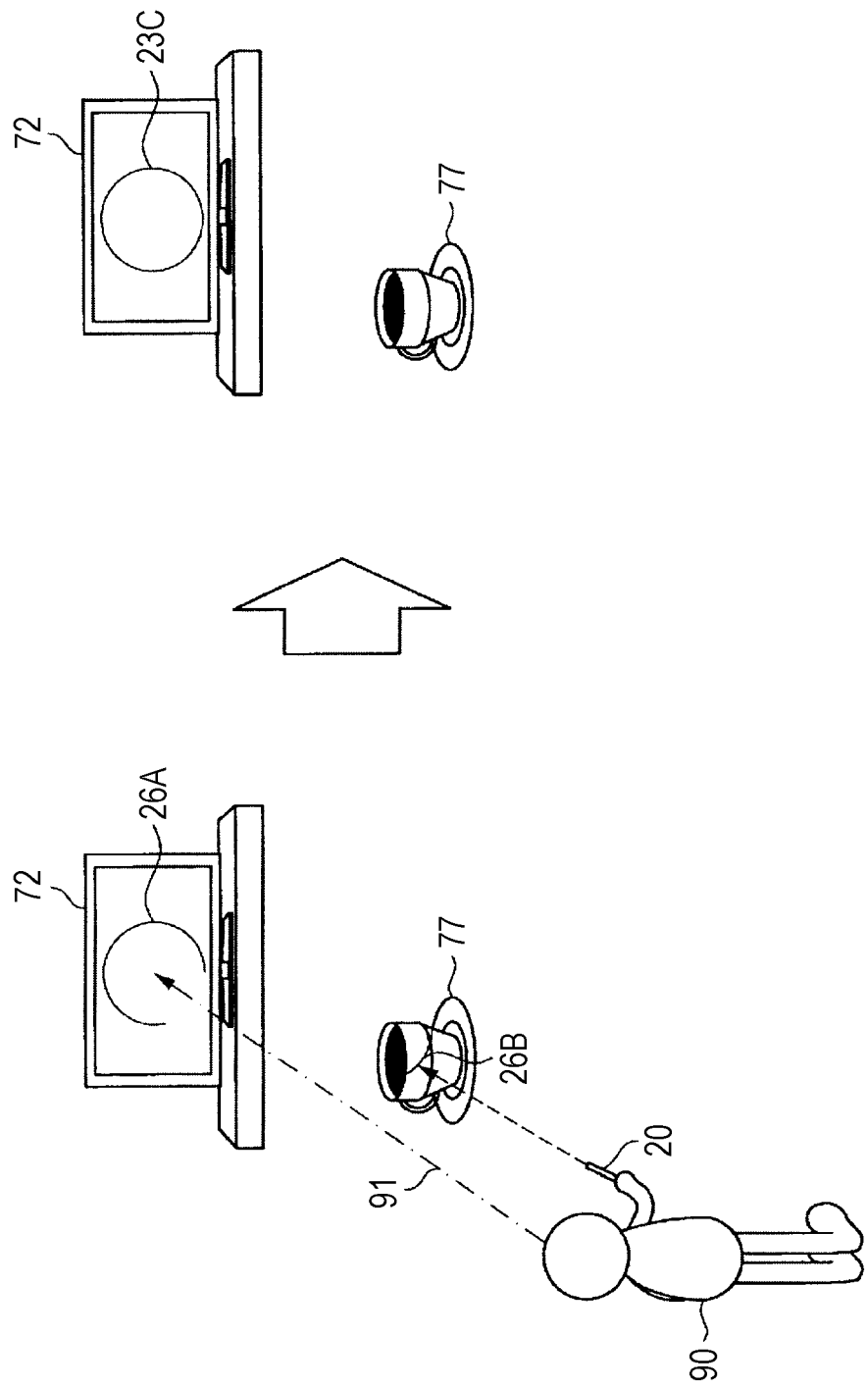
FIG. 16 is an explanatory diagram illustrating an example of selection determination based on a line of sight of the user according to the same embodiment.

As illustrated in FIG. 16, it is assumed that a plurality of selection targets exists on a straight line connecting the position of the output unit of the pointing device 20 (the position of the operation object) and the position indicated by the position information of the pointer. In this case, the selection control unit 146 may select one processing target from the plurality of selection targets on the basis of the line of sight of the user. FIG. 16 is an explanatory diagram illustrating an example of selection determination based on the line of sight of the user according to the embodiment of the present disclosure. A diagram illustrated on a left side of FIG. 16 illustrates an example in which when the mug 77 is present in front of the television 72, a track indicating that a selection target has been selected as a processing target extends over both the television 72 and the mug 77. A diagram on a right side of FIG. 16 illustrates an example in which the track is rearranged on one selection target when the shape of the track indicating that the selection target has been selected as the processing target extends over a plurality of selection targets.

For example, when it is possible to determine that the user 90 is looking at one of the plurality of selection targets on the basis of the line of sight of the user, the selection control unit 146 determines that the one selection target is selected as a processing target. In the example illustrated on the left side of FIG. 16, the shape of the track indicating that the selection target has been selected as the processing target is divided and exists as a track 26A and a track 26B on the television 72 and the mug 77, respectively. That is, the television 72 and the mug 77 are selected as a plurality of selection targets. However, the selection control unit 146 can determine that the user 90 is looking at the television 72 on the basis of a line of sight 91 of the user 90. Therefore, the selection control unit 146 determines that the television 72 is selected as a processing target.

Further, it is assumed that a plurality of selection targets exists on a straight line connecting the position of the output unit of the pointing device 20 (the position of the operation object) and the position indicated by the position information of the pointer, and the track overlaps with the plurality of selection targets. In this case, the selection control unit 146 may rearrange the track on one processing target selected from the plurality of selection targets.

For example, the selection control unit 146 selects one processing target from the plurality of selection targets on the basis of the line-of-sight of the user 90 as described using the diagram on the left side of FIG. 16, and rearranges the track on the processing target. Specifically, the selection control unit 146 determines that the television 72 is selected as the processing target on the basis of the line of sight 91 of the user 90. Then, the selection control unit 146 combines the track 26A and the track 26B to generate a track 23C illustrated on the right side of FIG. 16, and arranges the track 23C on the television 72.

Other Selection Determination

When the user selects a processing target by an operation such as finger-pointing or moving the line of sight without using the pointing device 20, the selection control unit 146 may detect the operation on the basis of the image captured by the camera (still image or moving image), and determine the selection target selected as the processing target.

Further, when the user 90 has selected a predetermined number of selection targets, the selection control unit 146 may perform control so that the user 90 can select no more selection target. For example, the selection control unit 146 may control the pointing device 20 to display a warning near the pointer. Furthermore, the selection control unit 146 may control the pointing device 20 so that responsiveness of the pointer deteriorates, for example, by reducing the moving speed of the pointer, or the like.

Further, when the user 90 moves the pointer largely to include a plurality of selection targets in the shape of one track indicating that the selection target has been selected as the processing target, the selection control unit 146 may determine once that all of the plurality of selection targets is selected as a processing target. Then, the operation processing control unit 148 may thereafter control the display process so that the user 90 can select or discard the processing targets at hand.

Further, note that the selection control unit 146 may determine a processing target selected from the selection targets on the basis of a selection instruction by voice of the user 90. For example, the selection control unit 146 determines that, when the user 90 speaks an instruction word such as "this" or "that", a selection target closer to the position of the pointer at the time of speaking is selected as the processing target. Further, further, the selection control unit 146 may cancel the selection of the processing target when the user 90 speaks of canceling the selection of the processing target.

(Operation Processing Control Unit 148)

The operation processing control unit 148 has a function of controlling the operation process. For example, the operation processing control unit 148 executes the batch operation process on a plurality of processing targets on the basis of the processing policy information detected before or after start of recording of the track. Specifically, when the detected processing policy indicates to execute the display process for displaying the processing target information of each of the plurality of processing targets, the operation processing control unit 148 acquires the processing target information and executes the display process as the batch operation process. Further, when the detected processing policy indicates to execute the operating process of causing the plurality of processing targets to operate, the operation processing control unit 148 executes the operating process as the batch operation process.

Processing Target Information Acquisition Process

In a case where the processing policy is to execute the display process, the operation processing control unit 148 acquires the processing target information regarding each of the processing targets. The acquisition source of the processing target information differs depending on whether or not the processing target is a communicable information processing device. For example, in a case where the processing target is a communicable information processing device, the operation processing control unit 148 causes the communication unit 130 to communicate with the processing target, and acquires information received from the processing target by the communication unit 130 as the processing target information. Specifically, in a case where the processing target is the television 72 that is communicable, the operation processing control unit 148 acquires program information acquired by communication between the television 72 and the communication unit 130 as the processing target information. On the other hand, in a case where the processing target is an information processing device that is non-communicable, the operation processing control unit 148 acquires the processing target information from other than the processing target. Further, in a case where the processing target is an object that is not an information processing device, the operation processing control unit 148 similarly acquires the processing target information from other than the processing target. Specifically, in a case where the processing target is the television 72 that is non-communicable, the operation processing control unit 148, for example, causes the communication unit 130 to communicate with an external server apparatus, and acquires program information of the television 72 received from an external server apparatus by the communication unit 130 as the processing target information. Further, in a case where the processing target is an object that is not an information processing device such as the desk calendar 71, the operation processing control unit 148 acquires calendar information from the storage unit 150 as the processing target information, for example. Then, the operation processing control unit 148 causes the projection device 50 to collectively project the acquired plurality of pieces of processing target information to a position specified by the user. Note that the acquisition source of the processing target information in a case where the operation processing control unit 148 acquires the processing target information from other than the processing target is not limited to the example described above. Next, an example of the display process executed by the operation processing control unit 148 will be described with reference to FIGS. 17 to 21.

Layout Configuration of Processing Target Information Based on Shape of Track

Figure 17:
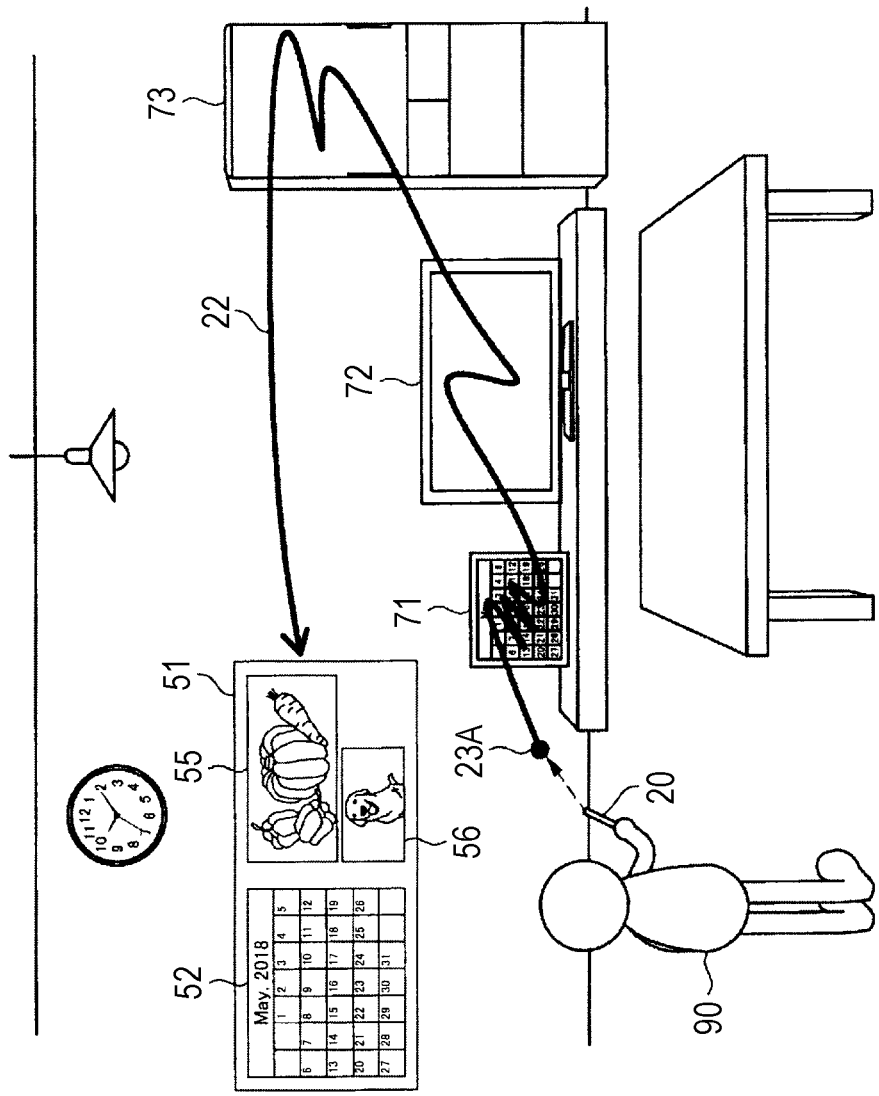
FIG. 17 is an explanatory diagram illustrating a display example of information at a specified position based on an instruction by the user according to the same embodiment.

FIG. 17 is an explanatory diagram illustrating a display example of information at a specified position based on an instruction by the user according to the embodiment of the present disclosure. In the example illustrated in FIG. 17, the user 90 operates the pointing device 20 and moves the pointer from the start position 23A like the track 22, so as to select the desk calendar 71, the television 72, and the refrigerator 73 as processing targets. Then, an example is illustrated in which the calendar information 52 that is information regarding the desk calendar 71, a program video 56 that is information regarding the television 72, and an in-compartment image 55 that is information regarding the refrigerator 73, which are selected as the processing targets, are projected as the processing target information 51.

When executing the display process as the batch operation process, the operation processing control unit 148 changes a layout of the processing target information 51 to be displayed, for example, on the basis of the shape of the track indicating to detect the processing target. Specifically, the operation processing control unit 148 configures the layout in the processing target information 51 so that respective pieces of the processing target information are displayed in descending order of the number of times of bending of the track 22 on the processing target. In the example illustrated in FIG. 17, the shape of the track 22 when the user 90 selects the desk calendar 71, the television 72, and the refrigerator 73 is such that the number of times of bending the track 22 increases in the order of the desk calendar 71, the refrigerator 73, and the television 72. Thus, as illustrated in FIG. 17, the operation processing control unit 148 displays the calendar information 52 in the largest size, the in-compartment image 55 in the second largest size, and the program video 56 in the smallest size.

As described above, the operation processing control unit 148 can automatically generate the layout when presenting the processing target information on the basis of a selection status of the processing targets.

Information Display at Position According to Processing Target Information

Figure 18:
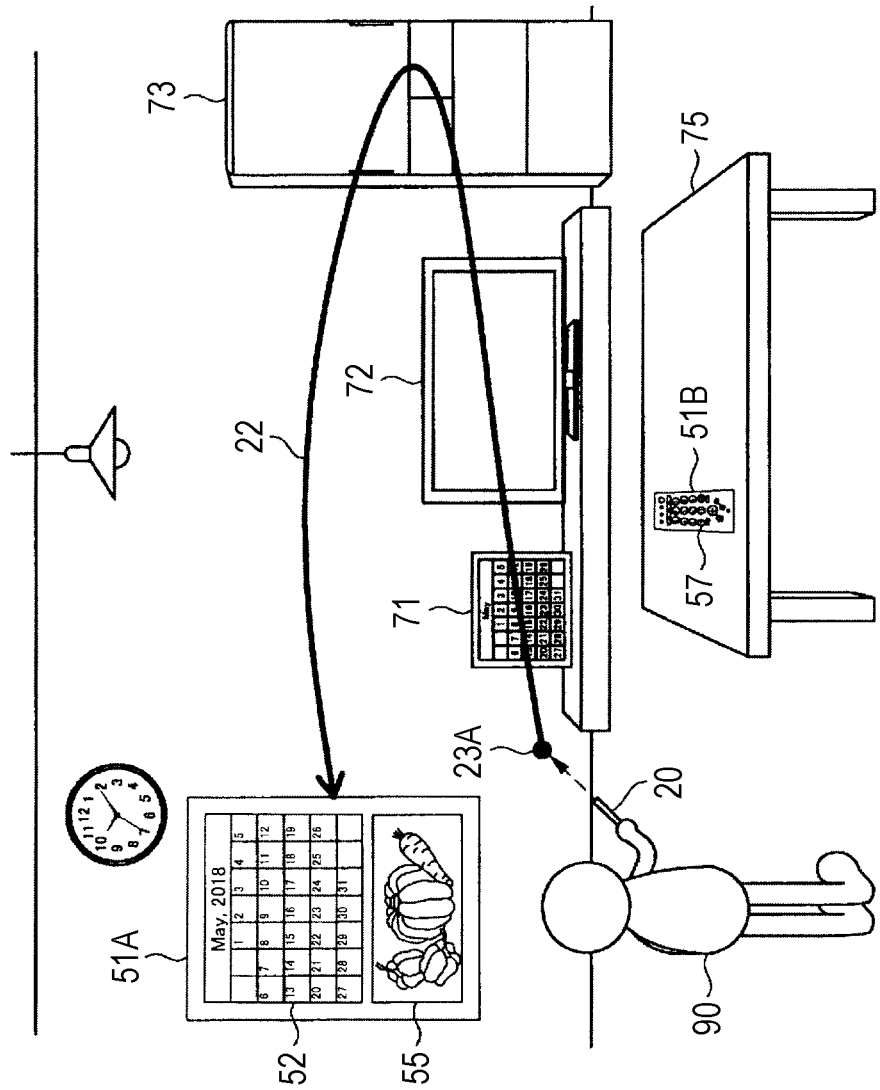
FIG. 18 is an explanatory diagram illustrating a display example of information at a position according to the processing targets according to the same embodiment.

As illustrated in FIG. 18, when the user has not specified the position to display the plurality of pieces of the processing target information, the operation processing control unit 148 determines the location to display each of the plurality of pieces of the processing target information on the basis of content of each of the plurality of pieces of the processing target information. Then, the operation processing control unit 148 causes the projection device 50 to project the processing target information corresponding to each determined location. FIG. 18 is an explanatory diagram illustrating a display example of information at a position according to the processing targets according to the embodiment of the present disclosure. In the example illustrated in FIG. 18, the user 90 operates the pointing device 20 and moves the pointer from the start position 23A like the track 22, so as to select the desk calendar 71, the television 72, and the refrigerator 73 as processing targets. Then, the calendar information 52 that is information regarding the desk calendar 71 and the in-compartment image 55 that is information regarding the refrigerator 73, which are selected as the processing targets, are projected as processing target information 51A on a wall surface of the space. Further, an example is illustrated in which a remote controller image 57, which is information regarding the television 72, is projected on the table 75 as processing target information 51B. Note that the user 90 can operate the television 72 by touching a button on the remote controller image 57.

When executing the display process as the batch operation process, for example, the operation processing control unit 148 determines a display location for every piece of the processing target information on the basis of the content of the acquired processing target information. For example, the calendar information 52 and the in-compartment image 55 have better visibility when displayed larger. Therefore, the operation processing control unit 148 causes the calendar information 52 and the in-compartment image 55 to be displayed large on the wall surface of the space as the processing target information 51A. Further, the remote controller image 57 is more convenient for the user if it is closer to the user 90. Thus, the operation processing control unit 148 displays the remote controller image 57 as the processing target information 51B on the table 75 close to the user 90.

Information Display in Case where there is No Position Specified by User

Figure 19:
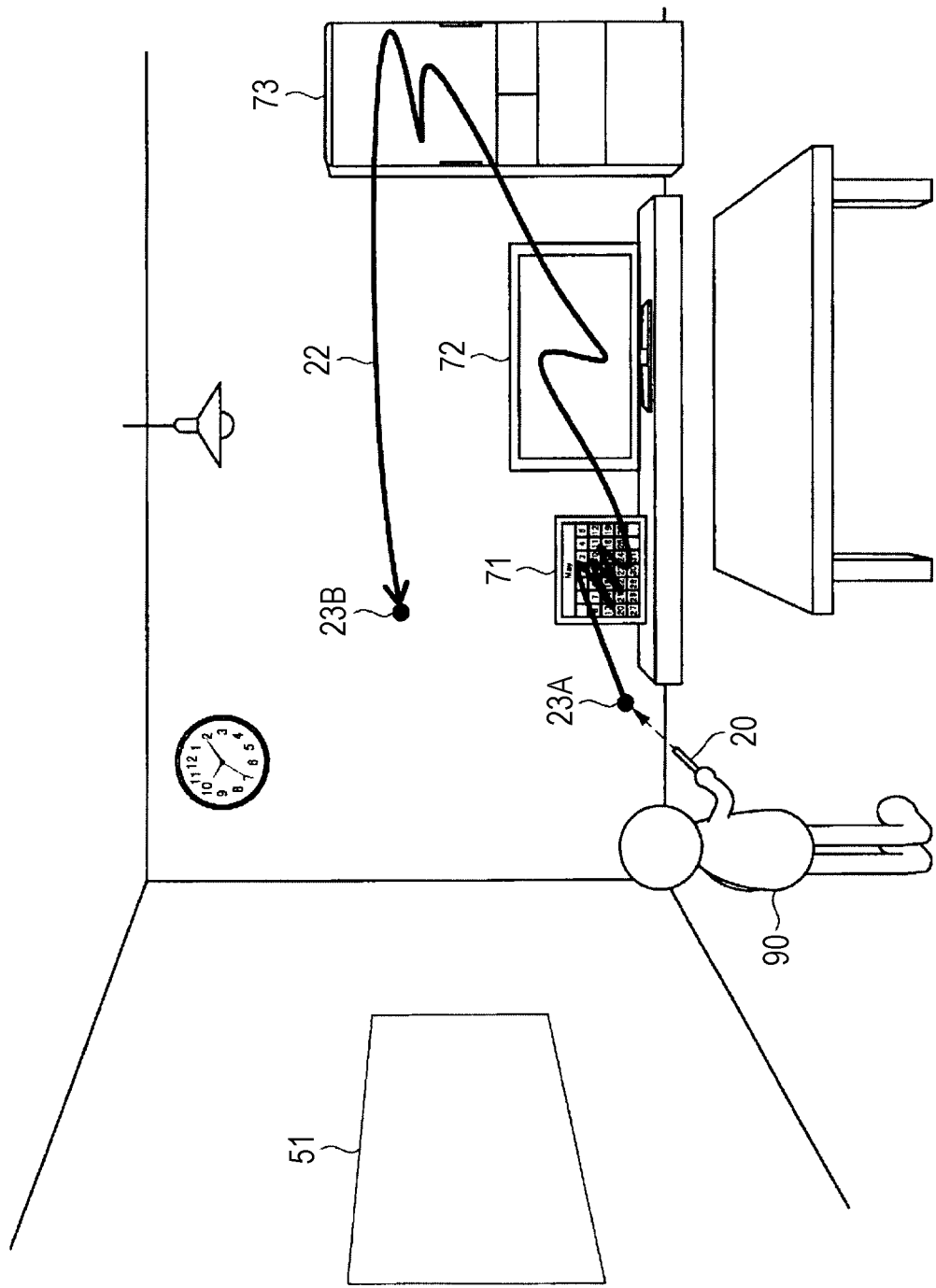
FIG. 19 is an explanatory diagram illustrating a display example of information when there is no position specification according to the same embodiment.

FIG. 19 is an explanatory diagram illustrating a display example of information in a case where there is no position specification according to the embodiment of the present disclosure. In the example illustrated in FIG. 19, the user 90 operates the pointing device 20 and moves the pointer from the start position 23A like the track 22, so as to select the desk calendar 71, the television 72, and the refrigerator 73 as processing targets. Then, information regarding the desk calendar 71, the television 72, and the refrigerator 73 selected as processing targets is projected as the processing target information 51 on the wall surface of the space.

In a case where there is no position specified by the user, for example, the operation processing control unit 148 may display the processing target information at a more suitable position on the basis of the content of the processing target information, the position of the user 90, and the like. In a case of the example illustrated in FIG. 19, since the processing target information 51 includes information regarding the desk calendar 71 including characters, visibility thereof is better when it is displayed on a wall surface that allows larger display. Further, the user 90 can easily visually recognize the processing target information 51 when it is displayed at a position closer to the user 90. Thus, the operation processing control unit 148 displays the processing target information 51 on a wall surface closer to the user 90 illustrated in FIG. 19.

Information Display in Case where there is No Position Specified by User and Display Position Cannot be Estimated FIG. 20 is an explanatory diagram illustrating a display example of information when there is no position specification according to the embodiment of the present disclosure and the display position cannot be estimated. The diagram illustrated on an upper side of FIG. 20 is a diagram in which the user 90 is instructed to specify the display position of information after selecting the processing targets. The diagram illustrated on a lower side of FIG. 20 is a diagram in which the user 90 specifies the display location of information.

In the diagram illustrated on the upper side of FIG. 20, the user 90 operates the pointing device 20 and moves the pointer from the start position 23A to the end position 23B like the track 22, so as to select the desk calendar 71, the television 72, and the refrigerator 73 as processing targets. However, it is assumed that the position for displaying the processing target information has not been specified.

In a case where the position is not specified by the user as described above, the operation processing control unit 148 may display the processing target information at a more suitable position on the basis of the content of the processing target information and the position of the user 90, and the like, for example. However, in a case where having failed to estimate a proper position, the operation processing control unit 148 may instruct the user 90 by voice using the speaker 80 to specify the position to display the processing target information. For example, the operation processing control unit 148 causes the speaker 80 to output a voice as "please specify a place to display information" as illustrated in the upper diagram of FIG. 20.

Upon receiving the instruction from the operation processing control unit 148, as illustrated in the lower diagram of FIG. 20, the user 90 speaks "here." and specifies a position 25 where the processing target information is to be displayed with the pointing device 20 on the table 75. Then, upon detecting the position specification by the user 90, the operation processing control unit 148 causes the processing target information to be displayed at the detected position 25.

Change Content of Processing Target Information by Weight

FIG. 21 is an explanatory diagram illustrating a presentation example of information based on weights according to the embodiment of the present disclosure. In a case where one processing target has a plurality of pieces of processing target information, the operation processing control unit 148 may set a weight to each of the plurality of pieces of processing target information, and the processing target information to which the weight corresponding to the state of the track detected on the processing target is set may be displayed. For example, the operation processing control unit 148 sets a weight to each of the plurality of pieces of processing target information, and the operation processing control unit 148 causes the projection device 50 to project the processing target information to which the weight corresponding to a time during which the pointer has moved on the processing target is set.

For example, in a case where the television has a remote controller image 53A and program information 53B as the processing target information, the operation processing control unit 148 sets a weight 1 to the remote controller image 53A and sets the program information 53B. Further, the operation processing control unit 148 sets conditions such that, if the time during which the pointer has moved on the processing target is less than a predetermined time, the processing target information with the weight 1 is selected, or if the time during which the pointer has moved on the processing target is equal to or greater than the predetermined time, the processing target information with a weight 2 is selected.

In the weight example 1 of FIG. 19, it is assumed that the time during which the pointer has moved on the television 72 that is the processing target is less than the predetermined time. In this case, according to the setting example of the weight and the condition described above, the remote controller image 53A is displayed as the processing target information as in the display example 1. Further, in the weight example 2 of FIG. 19, it is assumed that the time during which the pointer has moved on the television 72 that is the processing target is equal to or greater than the predetermined time. In this case, according to the setting example of the weight and the conditions described above, the program information 53B is displayed as the processing target information as in the display example 2.

Information Presentation when Processing Target is Virtual Object

When the user 90 selects a virtual object projected by the projection device 50 as a processing target, the operation processing control unit 148 may cause the projection device 50 to further project information regarding the virtual object as a virtual object, for example.

Operating Process of Real Object

In the following, an example of an operating process executed by the operation processing control unit 148 will be described with reference to FIG. 22. FIG. 22 is an explanatory diagram illustrating an example of an operating process according to the embodiment of the present disclosure. A diagram illustrated on an upper side of FIG. 22 is a diagram illustrating that the user 90 has selected a processing target. A diagram illustrated on a lower side of FIG. 22 is a diagram illustrating that the user 90 has specified an operating process.

When the batch operation process is an operation process that causes each of a plurality of processing targets to perform the same operation, the operation processing control unit 148 causes each of the plurality of processing targets to collectively perform the operating process specified by the user. For example, in the diagram illustrated on the upper side of FIG. 22, the user 90 operates the pointing device 20 and moves the pointer from the start position 23A to the end position 23B like the track 22, so as to select the television 72 and the light 74 as processing targets. After selecting the processing targets, as illustrated in the diagram on the lower side of FIG. 22, the user 90 gives an instruction regarding the operating process by speaking "turn on." Upon detecting the instruction, the operation processing control unit 148 causes the television 72 and the light 74, which are processing targets, to collectively execute the operating process to turn on the power according to the instruction.

(3) Storage Unit 150

The storage unit 150 has a function of storing data acquired by processing in the information processing apparatus. For example, the storage unit 150 stores the position information of the pointer, the names of selection targets, and the position information of the selection targets, which are output by the storage control unit 144. Note that the information stored in the storage unit 150 is not limited to the above-mentioned track data. For example, the storage unit 150 may store the processing target information of the processing target. Further, the storage unit 150 may store data output in processing of the control unit 140, programs such as various applications, and data, and the like.

The functional configuration example of the information processing server 10 according to the embodiment of the present disclosure has been described above with reference to FIGS. 6 to 22. Next, an operating example according to the embodiment of the present disclosure will be described.

<1.4. Operating Example>

(1) Operating Example of Information Processing System

Figure 23:
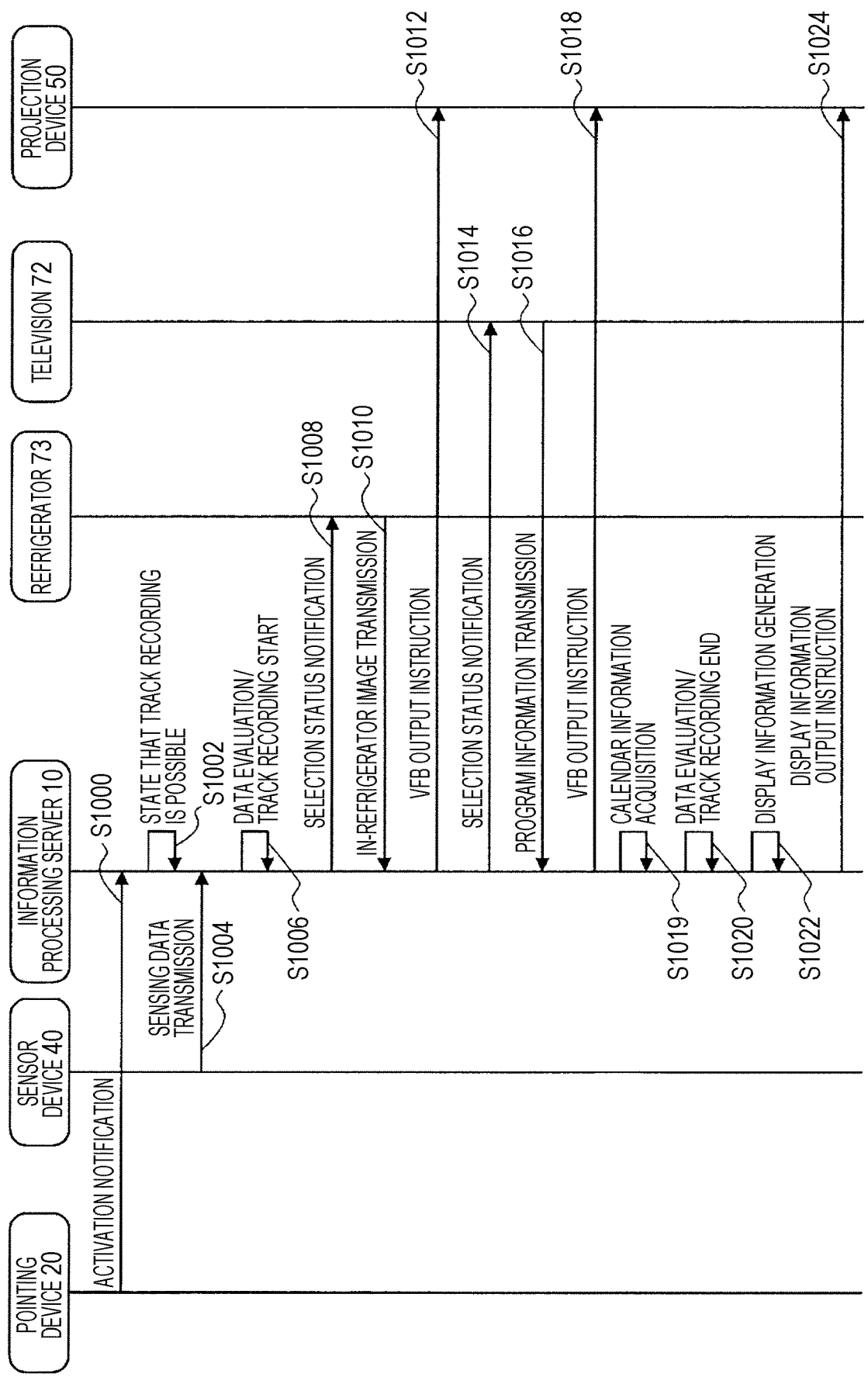
FIG. 23 describes an operating example of the information processing system according to the same embodiment.

Hereinafter, an operating example of the information processing system according to the embodiment of the present disclosure will be described with reference to FIG. 23. FIG. 23 is a sequence diagram illustrating an operating example of the information processing system according to the embodiment of the present disclosure. Note that in the following, the display process when the user uses the pointing device 20 to select the processing target in the order of the refrigerator 73, the television 72, and the desk calendar 71 will be described. Further, it is assumed that the refrigerator 73 and the television 72 are objects that are communicable information processing devices, and the desk calendar 71 is an object that is not an information processing device.

As illustrated in FIG. 23, first, when the pointing device 20 is activated by a user operation or the like as a trigger, the pointing device 20 notifies the information processing server 10 of the activation (step S1000). Upon receiving the notification that the pointing device 20 has been activated, the information processing server 10 enters a state that the track of the pointer can be recorded (step S1002). The sensor device 40 transmits sensing data obtained by sensing the space to the information processing server 10 (step S1004).

When the information processing server 10 detects the pointer on the basis of the sensing data, the information processing server 10 starts a recording process of the track of the pointer and the detection process of the processing target (step S1006).

The refrigerator 73 is detected in the detection process, and thus the information processing server 10 determines that the refrigerator 73 is a communicable information processing device, and then notifies the refrigerator 73 that the refrigerator 73 is selected as a processing target (step S1008). Upon receiving the notification of being selected as the processing target, the refrigerator 73 transmits an image in the refrigerator to the information processing server 10 as information regarding the processing target (step S1010). Upon receiving the image in the refrigerator from the refrigerator 73, the information processing server 10 transmits an instruction to the projection device 50 to perform VFB output to the refrigerator 73 (step S1012).

Subsequently, the television 72 is detected in the detection process, and thus the information processing server 10 determines that the television 72 is a communicable information processing device, and then notifies the television 72 that the television 72 is selected as a processing target (step S1014). Upon receiving the notification of being selected as the processing target, the television 72 transmits program information to the information processing server 10 as information regarding the processing target (step S1016). Upon receiving the program information from the television 72, the information processing server 10 transmits an instruction to the projection device 50 to perform VFB output to the television 72 (step S1018).

Subsequently, the desk calendar 71 is detected in the detection process, and thus the information processing server 10 determines that the desk calendar 71 is an object that is not an information processing device, and then acquires information regarding the desk calendar 71 from the storage unit 150 (step S1019).

Upon detecting ending of the recording process of the track of the pointer on the basis of the sensing data, the information processing server 10 ends the recording process of the track of the pointer. Further, the information processing server 10 evaluates the processing target selected in the entire one-stroke drawing (step S1020). The information processing server 10 generates display information to be projected by the projection device 50 on the basis of the evaluation result, and determines the position to project the generated display information (step S1022). Then, the information processing server 10 transmits an instruction to project the display information at the determined position to the projection device 50 (step S1024).

(2) Operating Example of Information Processing Apparatus

Hereinafter, an operating example of the information processing server 10 according to the embodiment of the present disclosure will be described with reference to FIGS. 24 and 25.

(Main Process)

Hereinafter, the flow of a main process of the information processing server 10 according to the embodiment of the present disclosure will be described with reference to FIG. 24. FIG. 24 is a flowchart illustrating the main process of the information processing apparatus according to the embodiment of the present disclosure.

Figure 24:
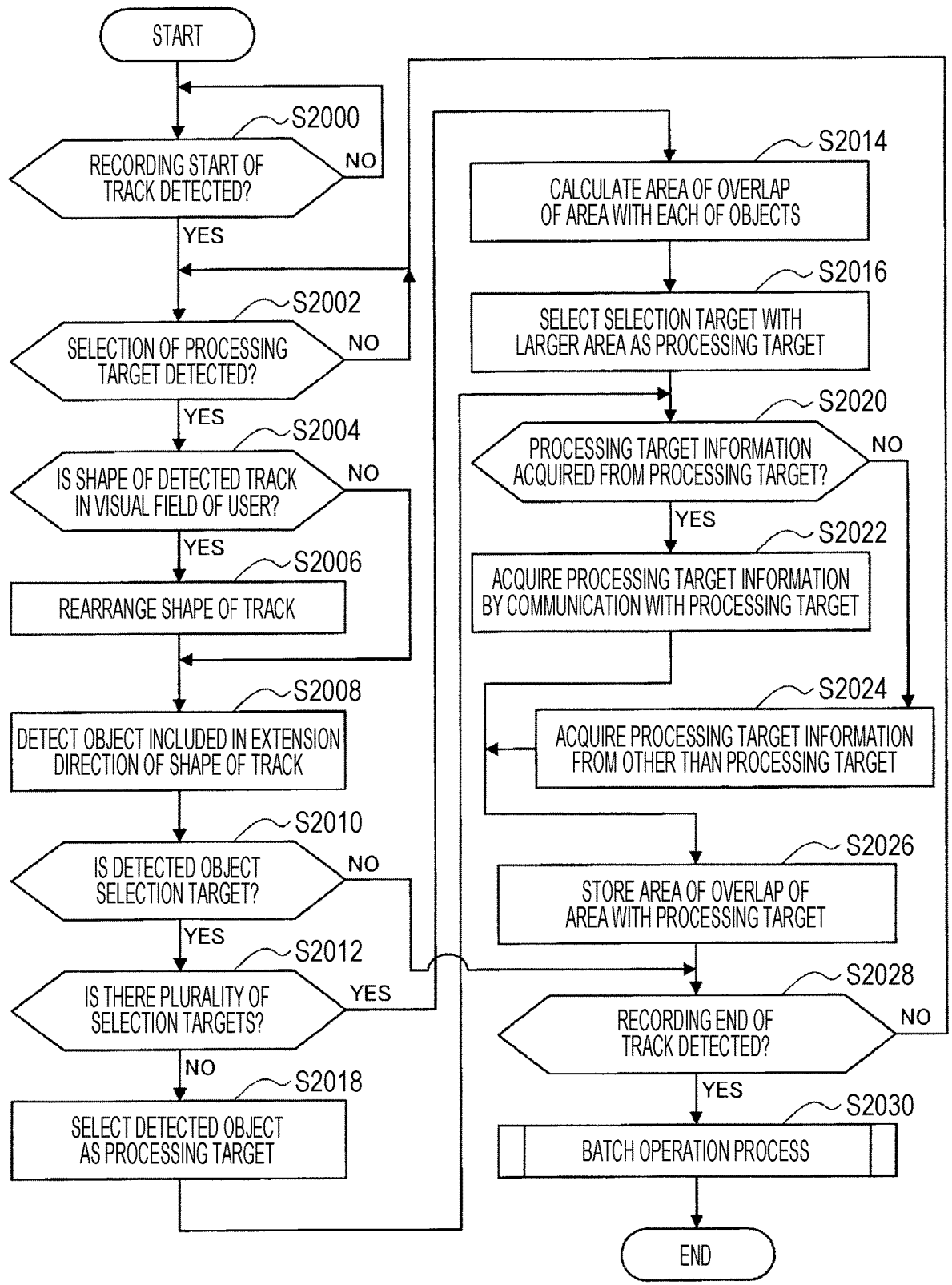
FIG. 24 is a flowchart illustrating a main process of an information processing server according to the same embodiment.

As illustrated in FIG. 24, first, the information processing server 10 confirms whether or not a recording start of the track is detected (step S2000). When the recording start of the track is not detected (NO in step S2000), the information processing server 10 repeats the process of step S2000 until detecting the recording start of the track.

When the recording start of the track is detected (YES in step S2000), the information processing server 10 confirms whether or not selection of the processing target by the user is detected (step S2002). When the selection of the processing target is not detected (NO in step S2002), the information processing server 10 repeats the process of step S2002 until detecting the selection of the processing target.

When the selection of the processing target is detected (YES in step S2002), the information processing server 10 confirms whether or not the shape of the track when the processing target is selected is within the visual field of the user (step S2004). When the area is not within the visual field of the user (NO in step S2004), the information processing server 10 executes a process of step S2008 described later.

When the shape of the detected track is within the visual field of the user (YES in step S2004), the information processing server 10 rearranges the shape of the detected track (step S2006) and executes the process of step S2008.

In step S2008, the information processing server 10 detects an object existing in the extension direction of the shape of the detected track (step S2008). After detecting the object, the information processing server 10 confirms whether or not the detected object is a selection target (step S2010). When the detected object is not the selection target (NO in step S2010), the information processing server 10 executes a process of step S2022 described later.

When the detected object is the selection target (YES in step S2010), the information processing server 10 confirms whether or not a plurality of selection targets exists (step S2012). When the plurality of selection targets does not exist (NO in step S2012), the information processing server 10 selects the detected object as the processing target (step S2018), and executes a process of step S2020 described later.

When the plurality of selection targets exists (YES in step S2012), the information processing server 10 calculates the area of a portion where an area surrounded by the track overlaps with each of the selection targets (step S2014). After calculating the area, the information processing server 10 selects a selection target having a larger area as a processing target (step S2016), and executes the process of step S2020.

In the process of step S2020, the information processing server 10 confirms whether or not to acquire processing target information from the selected processing target. When acquiring the processing target information from the processing target (YES in step S2020), the information processing server 10 acquires the processing target information from the processing target by communicating with the processing target (step S2022), and executes a process of step S2026. On the other hand, when not acquiring the processing target information from the processing target (NO in step S2020), the information processing server 10 acquires the processing target information from other than the processing target such as the storage unit 150 or an external server (step S2024) and executes the process of step S2026.

In the process of step S2026, the information processing server 10 stores the area of the portion where the area overlaps with the processing target in the area calculated in step S2014 (step S2026), and executes a process of step S2028.

In the process of step S2028, the information processing server 10 confirms whether or not a recording end of the track is detected (step S2028). When the recording end of the track is detected (YES in step S2028), the information processing server 10 executes the batch operation process (step S2030) and ends the process. Note that the detailed process flow of the batch operation process will be described later.

When the recording end of the track is not detected (NO in step S2028), the information processing server 10 repeats the above-described processing from step S2002 to step S2026 until the recording end of the track is detected.

(Batch Operation Process)

Next, a flow of the batch operation process of the information processing server 10 according to the embodiment of the present disclosure will be described with reference to FIG. 25. FIG. 25 is a flowchart illustrating a batch operation process according to the embodiment of the present disclosure.

Figure 25:
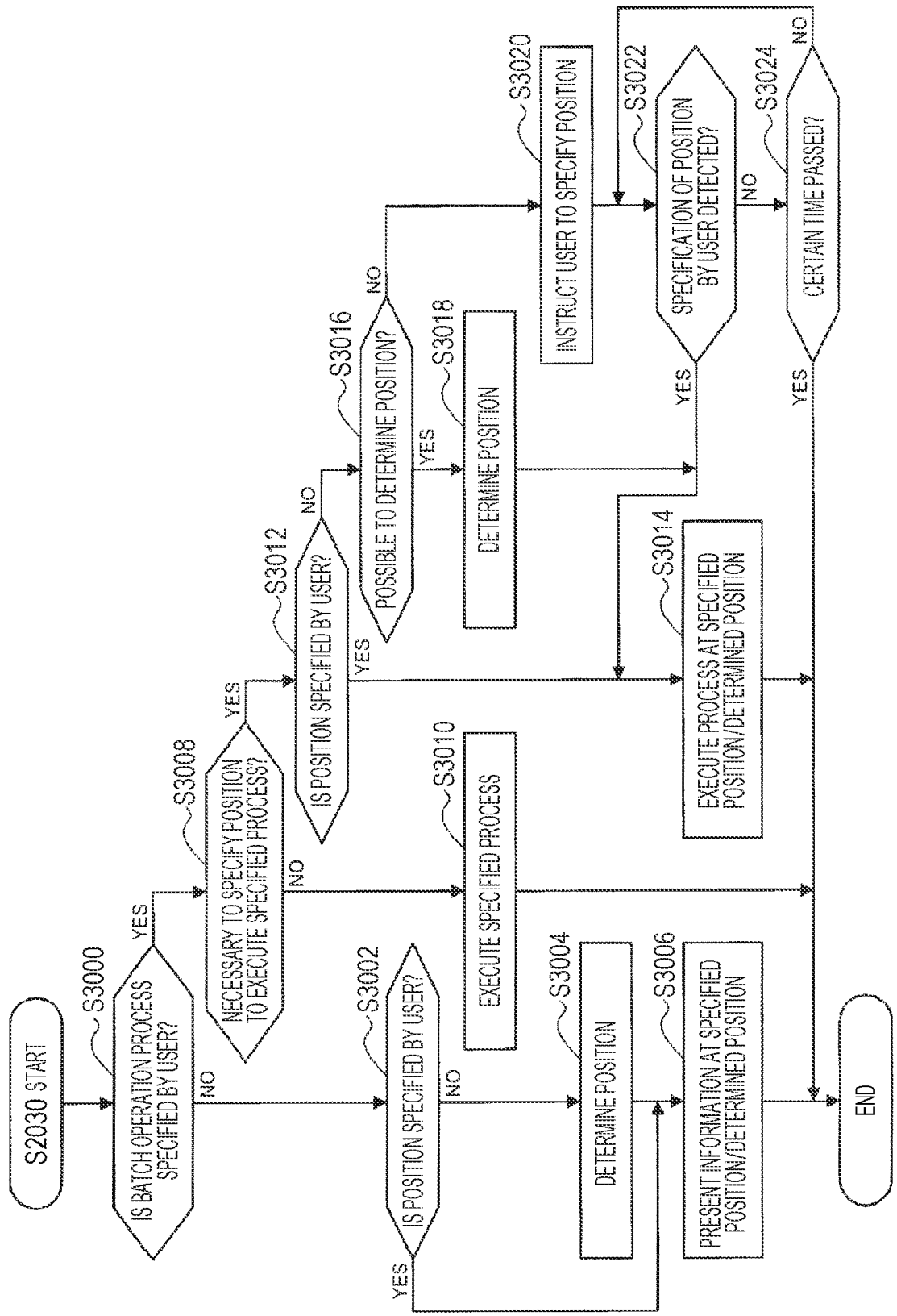
FIG. 25 is a flowchart illustrating a batch operation process according to the same embodiment.

As illustrated in FIG. 25, first, the information processing server 10 confirms whether or not the batch operation process to be executed is specified by the user (step S3000). When the batch operation process is specified (YES in step S3000), the information processing server 10 executes a process of step S3008 described later.

When the batch operation process is not specified (NO in step S3000), the information processing server 10 confirms whether or not a position is specified by the user (step S3002). When the position is specified (YES in step S3002), the information processing server 10 causes the projection device 50 to project the information regarding the processing target to the position specified by the user (step S3006), and ends the batch operation process.

When the position is not specified (NO in step S3002), the information processing server 10 determines the position (step S3004), causes the projection device 50 to project information regarding the processing target to the determined position (step S3006), and ends the batch operation process.

In step S3008, the information processing server 10 confirms whether or not it is necessary to specify the position in order to execute the batch operation process specified by the user (step S3008). When it is necessary to specify the position (YES in step S3008), the information processing server 10 executes a process of step S3012 described later.

When it is not necessary to specify the position (NO in step S3008), the information processing server 10 executes the batch operation process specified by the user (step S3010), and ends the batch operation process.

In step S3012, the information processing server 10 confirms whether or not a position is specified by the user (step S3012). When the position is specified (YES in step S3012), the information processing server 10 executes the specified process at the specified position (step S3014), and ends the batch operation process.

When the position is not specified (NO in step S3012), the information processing server 10 confirms whether or not it is possible to determine the position to execute the specified process (step S3016). When it is possible to determine the position (YES in step S3016), the information processing server 10 determines the position (step S3018), executes the process specified at the determined position (step S3014), and ends the batch operation process.

When it is not possible to determine the position (NO in step S3016), the information processing server 10 instructs the user to specify the position to execute the process (step S3020). After instructing the user, the information processing server 10 confirms whether or not a specification of a position from the user is detected (step S3022). When the specification of the position from the user is detected (YES in step S3022), the information processing server 10 executes the specified process at the specified position (step S3014), and ends the batch operation process.

When the specification of the position from the user is not detected (NO in step S3022), the information processing server 10 confirms whether or not a certain time has passed (step S3024). When the certain time has not passed (NO in step S3024), the process of step S3022 is executed again.

When the certain time has passed (YES in step S3024), the information processing server 10 ends the batch operation process without executing the specified process.

The operating example according to the embodiment of the present disclosure has been described above with reference to FIGS. 23 to 25.

The embodiments of the present disclosure have been described above with reference to FIGS. 1 to 25. Next, a hardware configuration of the information processing apparatus according to the embodiment of the present disclosure will be described.

2. Hardware Configuration Example

Hereinafter, a hardware configuration example of the information processing apparatus according to the embodiment of the present disclosure will be described with reference to FIG. 26. FIG. 26 is a block diagram illustrating a hardware configuration example of the information processing server 10 according to the embodiment of the present disclosure. As illustrated in FIG. 26, the information processing server 10 includes, for example, a CPU 101, a ROM 103, a RAM 105, a host bus 107, a bridge 109, an external bus 111, and an interface 113. Further, the information processing server 10 also includes an input device 115, an output device 117, an audio output device 119, a storage device 121, a drive 123, a removable recording medium 125, and a communication device 127. Note that the hardware configuration illustrated here is an example, and some of the components may be omitted. Further, the hardware configuration may further include components other than the components illustrated here.

(CPU 101, ROM 103, RAM 105)

The CPU 101 functions as, for example, an arithmetic processing device or a control device, and controls overall operations or a part thereof of respective components on the basis of various programs recorded in the ROM 103, the RAM 105, the storage device 121, or the removable recording medium 125. The ROM 103 is a means for storing a program read by the CPU 101, data used for calculation, and the like. The RAM 105 temporarily or permanently stores, for example, a program read by the CPU 101 and various parameters and the like that change appropriately when the program is executed. These are connected to each other via the host bus 107 including a CPU bus or the like. The CPU 101, the ROM 103, and the RAM 105 can achieve the functions of the control unit 140 described with reference to FIG. 7, for example, in cooperation with software.

(Host bus 107, bridge 109, external bus 111, interface 113)

The CPU 101, the ROM 103, and the RAM 105 are connected to each other, for example, via the host bus 107 capable of high-speed data transmission. On the other hand, the host bus 107 is connected to the external bus 111, which has a relatively low data transmission rate, via the bridge 109, for example. Further, the external bus 111 is also connected to various components via the interface 113.

(Input Device 115)

As the input device 115, for example, a mouse, a keyboard, a touch panel, a button, a switch, a lever, or the like is used. Moreover, as the input device 115, a remote controller capable of transmitting a control signal using infrared rays or other radio waves may be used. Furthermore, the input device 115 includes an audio input device such as a microphone.

(Output Device 117, Audio Output Device 119)

The output device 117 includes a display device such as a cathode ray tube (CRT) display device or a liquid crystal display (LCD) device, for example. Further, the output device 117 includes a display device such as a projector device, an organic light emitting diode (OLED) device, and a lamp. Furthermore, the audio output device 119 is a device such as a speaker and a headphone.

(Storage Device 121)

The storage device 121 is a device for storing various data. As the storage device 121, for example, a magnetic storage device such as a hard disk drive (HDD), a semiconductor storage device, an optical storage device, a magneto-optical storage device, or the like is used. The storage device 121 can achieve the function of the storage unit 150 described with reference to FIG. 7 for example.

(Drive 123)

The drive 123 is, for example, a device that reads information recorded on the removable recording medium 125 such as a magnetic disk, an optical disk, a magneto-optical disk, or a semiconductor memory, or writes information on the removable recording medium 125.

(Removable Recording Medium 125)

The removable recording medium 125 is, for example, a DVD medium, a Blu-ray (registered trademark) medium, an HD-DVD medium, various types of semiconductor storage media, or the like. Of course, the removable recording medium 125 may be, for example, an IC card equipped with a non-contact type IC chip, an electronic device, or the like.

(Communication Device 127)

The communication device 127 is a communication device for connecting to a network, for example, a wired or wireless LAN, Bluetooth (registered trademark), or a communication card for Wireless USB (WUSB), a router for optical communication, a router for Asymmetric Digital Subscriber Line (ADSL), or a modem for various communications, or the like.

The hardware configuration example of the information processing apparatus according to the embodiment of the present disclosure has been described above with reference to FIG. 26.

3. Summary

As described above, the information processing apparatus according to the embodiment of the present disclosure detects, on the basis of position information of the pointer in a space and position information of selection targets in the space, a plurality of processing targets that is continuously selected by a user from a plurality of selection targets within the space. Further, the information processing apparatus according to the embodiment of the present disclosure performs a batch operation process of executing a batch operation on the detected plurality of processing targets on the basis of processing policy information indicating a processing policy specified by the user for the detected plurality of processing targets.

The information processing apparatus can collectively execute the operation processing on the plurality of processing targets by executing the batch operation process on the plurality of processing targets after the plurality of processing targets is selected.

Consequently, the information processing apparatus can provide a new and improved information processing apparatus, information processing method, and program capable of improving operability when the user collectively selects a plurality of objects.

The preferred embodiments of the present disclosure have been described above in detail with reference to the accompanying drawings, but the technical scope of the present disclosure is not limited to such examples. It is apparent that a person having ordinary knowledge in the technical field of the present disclosure can devise various change examples or modification examples within the scope of the technical idea described in the claims, and it will be naturally understood that they also belong to the technical scope of the present disclosure.

Further, the series of processes performed by each device described in the present description may be achieved using any of software, hardware, and combination of software and hardware. The program configuring the software is stored in advance in a recording medium (non-transitory medium) provided inside or outside each device, for example. Then, for example, each program is read into the RAM when the computer executes the program, and is executed by a processor such as a CPU.

Further, the processes described in the present description using the flowcharts and the sequence diagram does not necessarily have to be executed in the illustrated order. Some processing steps may be performed in parallel. Further, additional processing steps may be employed, and some processing steps may be omitted.

Furthermore, the effects described in the present description are merely illustrative or exemplary and are not limited. That is, the technology according to the present disclosure can exhibit other effects that are apparent to those skilled in the art from the present description in addition to or instead of the effects described above.

Note that configurations as follows also belong to the technical scope of the present disclosure.

(1)

An information processing apparatus including
a control unit that executes a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

(2)

The information processing apparatus according to (1) above, in which the control unit detects the plurality of processing targets that is continuously selected on the basis of a continuous track of the user-specified position information that is presented.

(3)

The information processing apparatus according to (2) above, in which the control unit sets, as the target range of the batch operation process, a range from a position of the user-specified position information where it is detected that a shape indicated by the user-specified position information that is continuously acquired is a shape indicating to start detection of the track, to a position of the user-specified position information where it is detected that the shape indicated by the user-specified position information that is continuously acquired is a shape indicating to end the detection of the track.

(4)

The information processing apparatus according to (2) above, in which the control unit starts detection of the track from a position of the user-specified position information where it is detected that the shape indicated by the user-specified position information that is continuously acquired is a shape indicating to detect the processing target.

(5)

The information processing apparatus according to any one of (2) to (4) above, in which the control unit determines whether or not the selection targets are selected as the processing targets on the basis of whether or not at least a part of a shape of the track indicating to detect the processing targets is formed on the selection targets.

(6)

The information processing apparatus according to (5) above, in which
when the shape of the track indicating to detect the processing targets and the selection targets partially overlap,
the control unit determines whether or not the selection targets are selected as the processing targets on the basis of whether or not a barycenter of the shape of the track indicating to detect the processing targets is present on the selection targets.

(7)

The information processing apparatus according to (5) above, in which
when the shape of the track indicating to detect the processing targets and the selection targets partially overlap,
the control unit determines whether or not the selection targets are selected as the processing targets on the basis of an area of a portion of the overlap.

(8)

The information processing apparatus according to any one of (2) to (7) above, in which when a plurality of the selection targets is present on a straight line connecting a position of an operation object and a position of the user-specified position information, the control unit selects one of the processing targets from the plurality of the selection targets on the basis of a line of sight of the user.

(9)

The information processing apparatus according to (8) above, in which when the plurality of the selection targets is present on the straight line connecting the position of the operation object and the position of the user-specified position information, and the track overlaps with the plurality of the selection targets, the control unit rearranges the track on one of the processing targets selected from the plurality of the selection targets.

(10)

The information processing apparatus according to any one of (2) to (9) above, in which the control unit excludes, among a plurality of the selection targets, selection target for which a process to be executed on the basis of the processing policy is not set from the plurality of the selection targets.

(11)

The information processing apparatus according to any one of (2) to (10) above, in which the control unit executes the batch operation process on the basis of an operation of the user indicating the processing policy information detected before starting or after ending of the recording of the track.

(12)

The information processing apparatus according to (11) above, in which the control unit transmits a request regarding the batch operation process to each of the plurality of processing targets via communication.

(13)

The information processing apparatus according to (11) or (12) above, in which when the batch operation process is a display process of displaying processing target information regarding each of the plurality of processing targets, the control unit acquires the processing target information and causes a projection device to collectively project a plurality of pieces of the acquired processing target information to a position specified by the user.

(14)

The information processing apparatus according to (13) above, in which when the user has not specified the position to display the plurality of pieces of processing target information, the control unit determines a location to display each of the plurality of pieces of processing target information on the basis of content of each of the plurality of pieces of processing target information, and causes the projection device to project the processing target information corresponding to each of the determined locations.

(15)

The information processing apparatus according to (13) or (14) above, in which the control unit changes the processing target information to be projected by the projection device according to a time during which the user-specified position information moves on the processing target.

(16)

The information processing apparatus according to any one of (11) to (15) above, in which.

when the batch operation process is an operation process of causing each of the plurality of processing targets to perform a same operation, the control unit causes each of the plurality of processing targets to collectively execute the operating process specified by the user.

(17)

The information processing apparatus according to any one of (2) to (16) above, in which a shape of the track indicating that the user has selected the processing target is different from a shape of the track indicating the processing policy.

(18)

The information processing apparatus according to any one of (1) to (17) above, in which the selection target is a real object that actually exists in the space or a virtual object projected by a projection device in the space.

(19)

An information processing method executed by a processor including executing a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

(20)

A program causing a computer to function as a control unit that executes a detection process of detecting, on the basis of user-specified position information in a space and target position information in the space, a plurality of processing targets that is continuously selected by a user from a plurality of selection targets within the space, and a batch operation process of executing a batch operation on the detected plurality of processing targets on the basis of processing policy information indicating a processing policy specified by the user for the detected plurality of processing targets.

REFERENCE SIGNS LIST

10 Information processing server
20 Pointing device
30 Environment evaluation device
40 Sensor device
50 Projection device
130 Communication unit
140 Control unit
142 Detection control unit
144 Storage control unit
146 Selection control unit
148 Operation processing control unit
150 Storage unit

The invention claimed is:

1. An information processing apparatus comprising:
a control unit configured to
execute a detection process of detecting, on a basis of user-specified position information in a space and target position information in the space, a plurality of processing targets that are continuously selected by a user from a plurality of selection targets within the space, and a batch operation process of executing a batch operation on the detected plurality of processing targets on a basis of processing policy information indicating a processing policy specified by the user for the detected plurality of processing targets, detect the plurality of processing targets that are continuously selected on a basis of a continuous track of the user-specified position information that is presented, and when two or more selection targets from the plurality of selection targets are present on a straight line connecting a position of an operation object and a position of the user-specified position information and the continuous track overlaps with the two or more selection targets, divide the continuous track on the two or more selection targets and combine the divided continuous track on one processing target of the plurality of processing targets selected from the two or more selection targets.

2. The information processing apparatus according to claim 1, wherein the control unit is further configured to set, as a target range of the batch operation process, a range from a first position of the user-specified position information where it is detected that a shape indicated by the user-specified position information that is continuously acquired is a first shape indicating to start detection of the continuous track, to a second position of the user-specified position information where it is detected that the shape indicated by the user-specified position information that is continuously acquired is a second shape indicating to end the detection of the continuous track.

3. The information processing apparatus according to claim 1, wherein the control unit is further configured to start detection of the continuous track from a position of the user-specified position information where it is detected that a shape indicated by the user-specified position information that is continuously acquired is a third shape indicating to detect a processing target.

4. The information processing apparatus according to claim 1, wherein the control unit is further configured to determine whether or not the plurality of selection targets are selected as the processing targets on a basis of whether or not at least a part of a shape of the continuous track indicating to detect the processing targets is formed on the plurality of selection targets.

5. The information processing apparatus according to claim 4, wherein when the shape of the continuous track indicating to detect the processing targets and the plurality of selection targets partially overlap, the control unit is further configured to determine whether or not the plurality of selection targets are selected as the processing targets on a basis of whether or not a barycenter of the shape of the continuous track indicating to detect the processing targets is present on the plurality of selection targets.

6. The information processing apparatus according to claim 4, wherein when the shape of the continuous track indicating to detect the processing targets and the plurality of selection targets partially overlap, the control unit is further configured to determine whether or not the plurality of selection targets are selected as the processing targets on a basis of an area of a portion of the overlap.

7. The information processing apparatus according to claim 1, wherein when the two or more selection targets from the plurality of selection targets are present on the straight line connecting the position of the operation object and the position of the user-specified position information, the control unit is further configured to select the one processing target of the plurality of processing targets from the two or more selection targets on a basis of a line of sight of the user.

8. The information processing apparatus according to claim 7, wherein when the two or more selection targets are present on the straight line connecting the position of the operation object and the position of the user-specified position information, and the continuous track overlaps with the two or more selection targets, the control unit is further configured to rearrange the divided continuous track on the one processing target.

9. The information processing apparatus according to claim 1, wherein the control unit is further configured to exclude, among the plurality of selection targets, a selection target for which a process to be executed on a basis of the processing policy is not set from the plurality of selection targets.

10. The information processing apparatus according to claim 1, wherein the control unit is further configured to execute the batch operation process on a basis of an operation of the user indicating the processing policy information detected before starting or after ending of a recording of the continuous track.

11. The information processing apparatus according to claim 10, wherein the control unit is further configured to transmit a request regarding the batch operation process to each processing target of the plurality of processing targets via communication.

12. The information processing apparatus according to claim 10, wherein when the batch operation process is a display process of displaying processing target information regarding each processing target of the plurality of processing targets, the control unit is further configured to acquire the processing target information and cause a projection device to collectively project a plurality of pieces of the acquired processing target information to a position specified by the user.

13. The information processing apparatus according to claim 12, wherein when the user has not specified the position to display the plurality of pieces of the processing target information, the control unit is further configured to determine a location to display each of the plurality of pieces of the processing target information on a basis of content of each piece of the plurality of pieces of the processing target information, and cause the projection device to project the each piece of the plurality of pieces of the processing target information corresponding to the determined location.

14. The information processing apparatus according to claim 12, wherein the control unit is further configured to change the processing target information to be projected by the projection device according to a time during which the user-specified position information moves on the processing target.

15. The information processing apparatus according to claim 11, wherein
when the batch operation process is an operation process of causing each processing target of the plurality of processing targets to perform a same operation,
the control unit is further configured to cause each processing target of the plurality of processing targets to collectively execute the operating process specified by the user.

16. The information processing apparatus according to claim 1, wherein a first shape of the continuous track indicating that the user has selected a processing target is different from a second shape of the continuous track indicating the processing policy.

17. The information processing apparatus according to claim 1, wherein the plurality of selection targets are real objects that actually exists in the space or virtual objects projected by a projection device in the space.

18. An information processing method executed by a processor comprising
executing a detection process of detecting, on a basis of user-specified position information in a space and target position information in the space, a plurality of processing targets that are continuously selected by a user from a plurality of selection targets within the space, and a batch operation process of executing a batch operation on the detected plurality of processing targets on a basis of processing policy information indicating a processing policy specified by the user for the detected plurality of processing targets;
detecting the plurality of processing targets that are continuously selected on a basis of a continuous track of the user-specified position information that is presented; and
when two or more selection targets from the plurality of selection targets are present on a straight line connecting a position of an operation object and a position of the user-specified position information and the continuous track overlaps with the two or more selection targets, dividing the continuous track on the two or more selection targets and combining the divided continuous track on one processing target of the plurality of processing targets selected from the two or more selection targets.

19. A non-transitory computer-readable medium having embodied thereon a program, which when executed by a computer causes the computer to execute an information processing method, the method comprising:
executing a detection process of detecting, on a basis of user-specified position information in a space and target position information in the space, a plurality of processing targets that are continuously selected by a user from a plurality of selection targets within the space, and a batch operation process of executing a batch operation on the detected plurality of processing targets on a basis of processing policy information indicating a processing policy specified by the user for the detected plurality of processing targets;
detecting the plurality of processing targets that are continuously selected on a basis of a continuous track of the user-specified position information that is presented; and
when two or more selection targets from the plurality of selection targets are present on a straight line connecting a position of an operation object and a position of the user-specified position information and the continuous track overlaps with the two or more selection targets, dividing the continuous track on the two or more selection targets and combining the continuous track on one processing target of the plurality of processing targets selected from the two or more selection targets.

* * * * *